United States Patent
Islam et al.

(10) Patent No.: US 10,728,002 B2
(45) Date of Patent: Jul. 28, 2020

(54) SYSTEM AND METHOD FOR ENABLING RELIABLE AND LOW LATENCY COMMUNICATION

(71) Applicant: Huawei Technologies Co., Ltd., Shenzhen (CN)

(72) Inventors: Toufiqul Islam, Ottawa (CA); Amine Maaref, Kanata (CA); Yongxia Lyu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 15/925,452

(22) Filed: Mar. 19, 2018

(65) Prior Publication Data

US 2019/0052432 A1 Feb. 14, 2019

Related U.S. Application Data

(60) Provisional application No. 62/543,825, filed on Aug. 10, 2017.

(51) Int. Cl.
*H04L 5/00* (2006.01)
*H04W 76/27* (2018.01)
*H04L 12/26* (2006.01)
*H04W 72/04* (2009.01)

(52) U.S. Cl.
CPC .......... *H04L 5/0053* (2013.01); *H04L 5/0005* (2013.01); *H04L 5/0094* (2013.01); *H04W 76/27* (2018.02); *H04L 5/0048* (2013.01); *H04L 43/08* (2013.01); *H04W 72/042* (2013.01)

(58) Field of Classification Search
None
See application file for complete search history.

(56) References Cited

U.S. PATENT DOCUMENTS

| 2015/0139175 | A1* | 5/2015 | Ratasuk | H04L 5/0051 370/330 |
| 2016/0234857 | A1* | 8/2016 | Chen | H04W 72/1231 |
| 2017/0135105 | A1 | 5/2017 | Li et al. | |
| 2017/0150367 | A1* | 5/2017 | Han | H04L 5/001 |
| 2018/0027576 | A1* | 1/2018 | Kowalski | H04W 72/0406 370/329 |
| 2018/0035332 | A1* | 2/2018 | Agiwal | H04J 11/003 |

(Continued)

FOREIGN PATENT DOCUMENTS

| CN | 105099634 A | 11/2015 |
| EP | 3018858 A1 | 5/2016 |
| WO | 2015039930 A1 | 3/2015 |

*Primary Examiner* — Otis L Thompson, Jr.
(74) *Attorney, Agent, or Firm* — Slater Matsil, LLP

(57) ABSTRACT

A system and method for multiplexing traffic. A wireless device such as a user equipment (UE) may receive a first signal over first resources assigned to carry a first downlink transmission from a base station, and receive a first downlink control indication (DCI) message from the base station. The first DCI message may include a pre-emption region (PR) indication and a PR bitmap, and the PR indication may indicate a location of a time-frequency region. The PR bitmap may include bits associated with different portions of the time-frequency region, and each of the bits in the PR bitmap may indicate whether a preemptive downlink transmission is present in the corresponding portion of the time-frequency region.

32 Claims, 12 Drawing Sheets

(56) References Cited

U.S. PATENT DOCUMENTS

| | | | |
|---|---|---|---|
| 2018/0035459 A1* | 2/2018 | Islam | H04L 5/0096 |
| 2018/0063865 A1* | 3/2018 | Islam | H04W 76/27 |
| 2018/0070341 A1* | 3/2018 | Islam | H04L 1/1887 |
| 2018/0270798 A1* | 9/2018 | Park | H04W 72/042 |
| 2018/0270800 A1* | 9/2018 | Park | H04W 72/042 |
| 2018/0278368 A1* | 9/2018 | Kim | H04L 1/1829 |
| 2018/0278454 A1* | 9/2018 | Islam | H04L 1/1887 |
| 2018/0279326 A1* | 9/2018 | Park | H04L 5/0053 |
| 2018/0324816 A1* | 11/2018 | Islam | H04W 72/048 |
| 2018/0367257 A1* | 12/2018 | Li | H04L 1/1812 |
| 2019/0098612 A1* | 3/2019 | Babaei | H04W 72/042 |
| 2019/0141647 A1* | 5/2019 | Nimbalker | H04L 5/001 |
| 2019/0165902 A1* | 5/2019 | Li | H04L 5/0005 |
| 2019/0254081 A1* | 8/2019 | Li | H04L 1/1607 |
| 2019/0254088 A1* | 8/2019 | Park | H04L 1/0061 |
| 2019/0268930 A1* | 8/2019 | Rudolf | H04W 72/14 |
| 2019/0281622 A1* | 9/2019 | Hwang | H04W 52/58 |
| 2019/0306848 A1* | 10/2019 | Zhou | H04W 72/0406 |

* cited by examiner

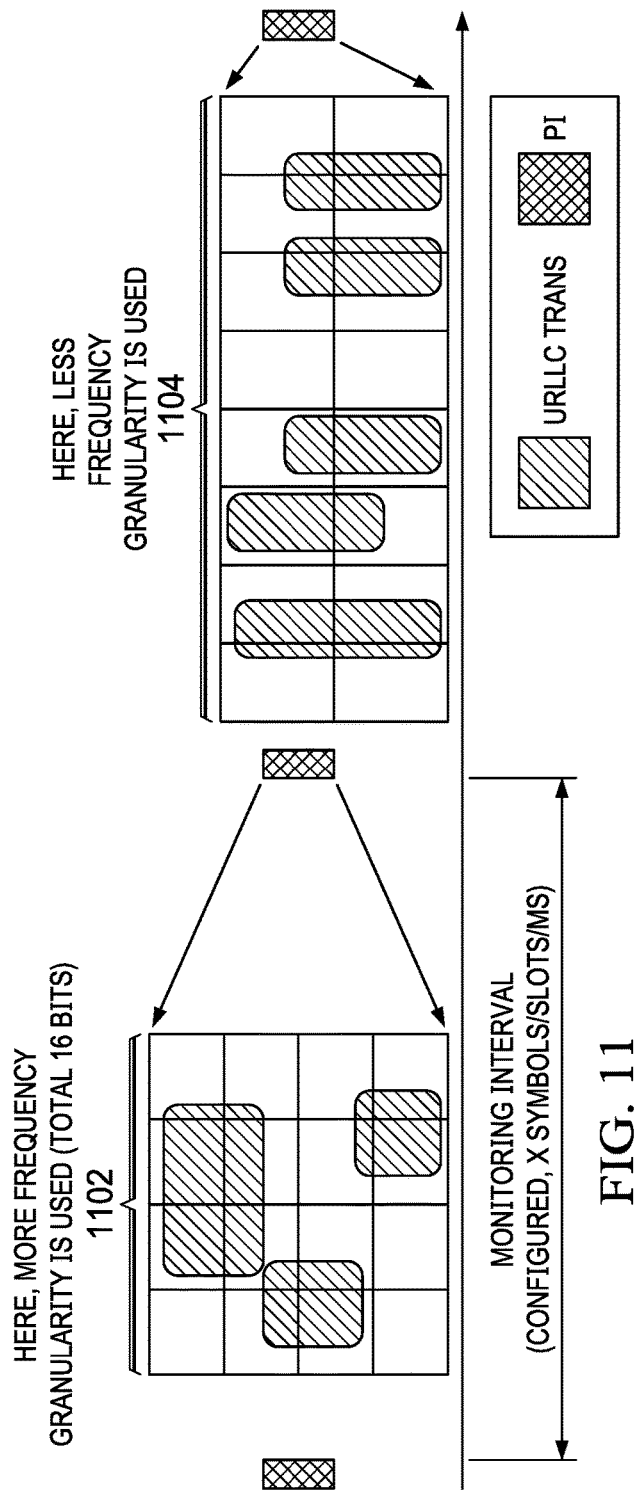
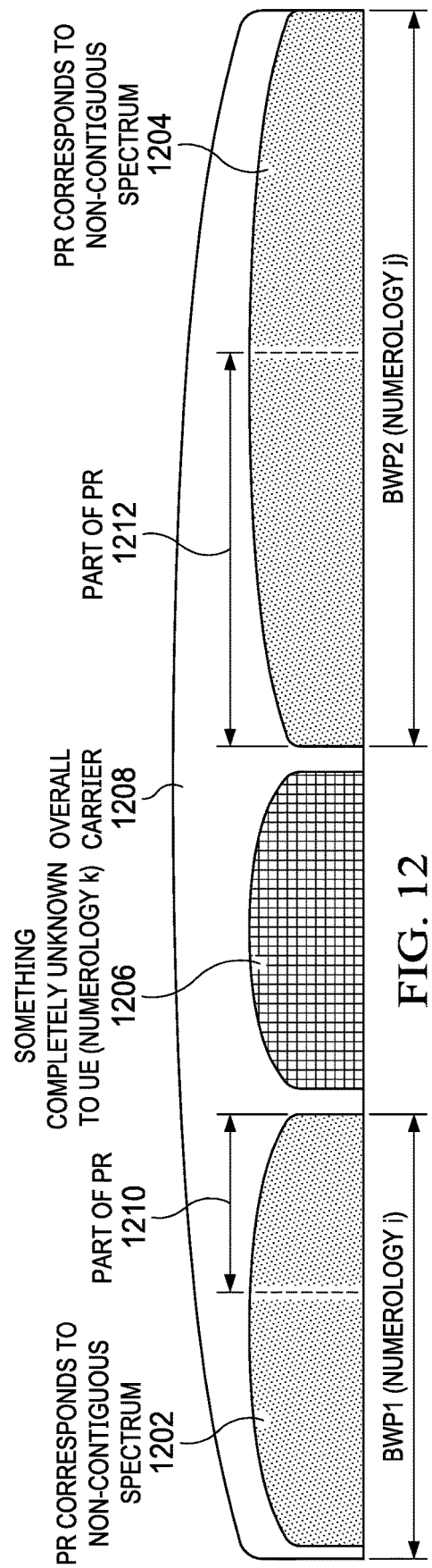
FIG. 11
FIG. 12

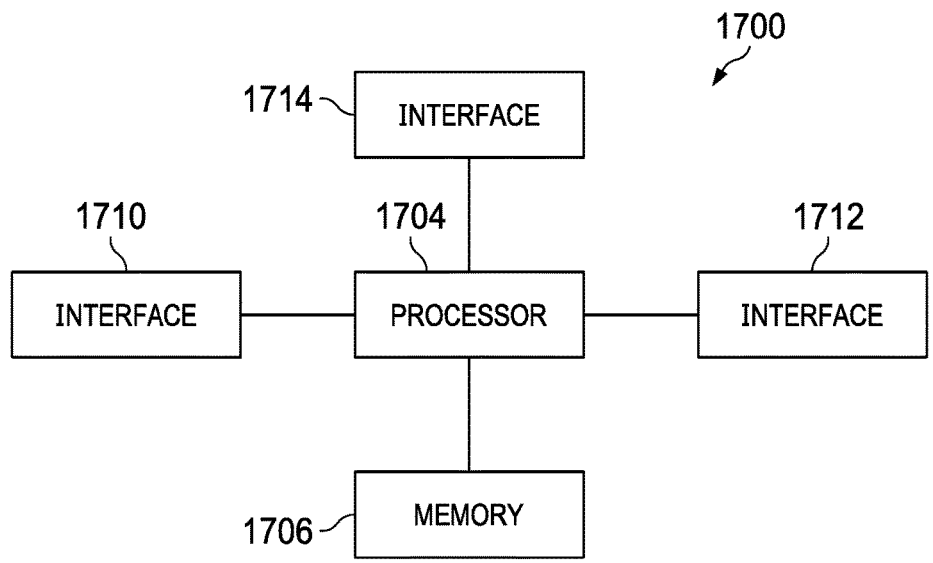
FIG. 17
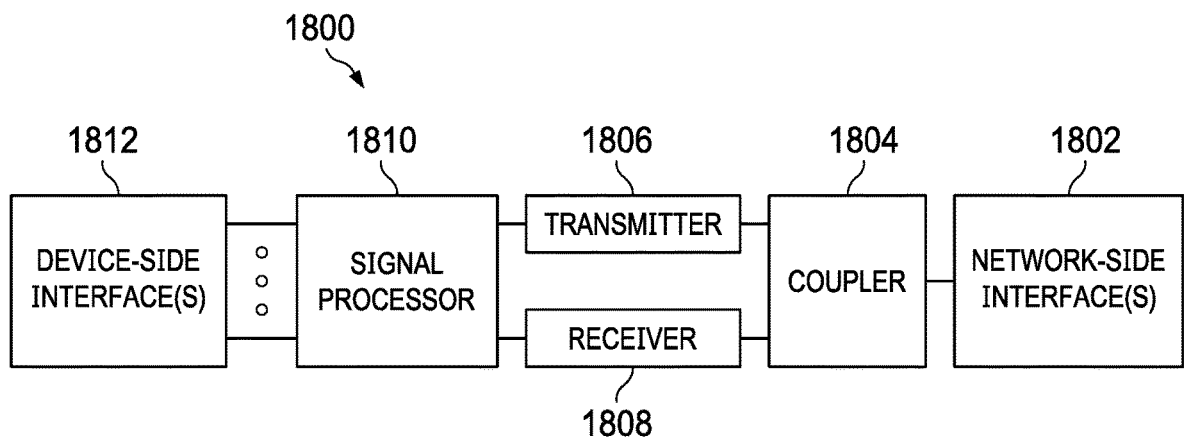
FIG. 18
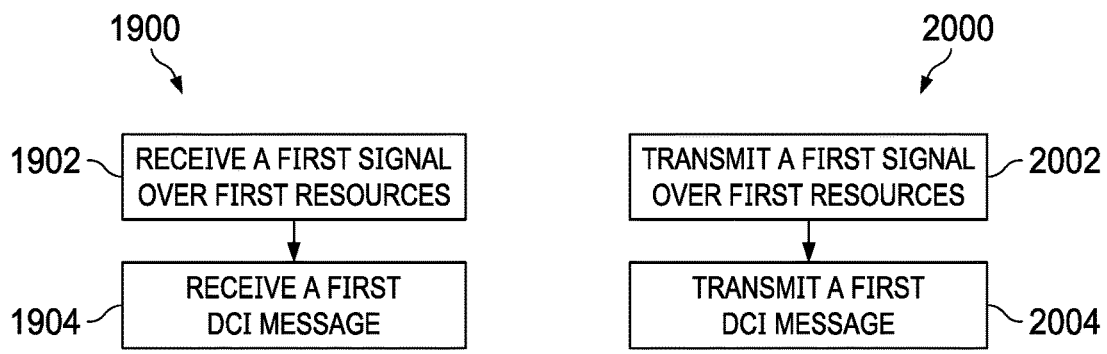
FIG. 19
FIG. 20

US 10,728,002 B2

SYSTEM AND METHOD FOR ENABLING RELIABLE AND LOW LATENCY COMMUNICATION

This application claims priority to U.S. Provisional Patent Application No. 62/543,825, filed Aug. 10, 2017, entitled "System and Method for Enabling Reliable and Low Latency Communication," which is hereby incorporated by reference herein as if reproduced in its entirety.

TECHNICAL FIELD

The present invention relates generally to managing the allocation of resources in a network, and in particular embodiments, to techniques and mechanisms for a system and method for enabling reliable and low latency communication.

BACKGROUND

In some wireless communication systems, a user equipment (UE) wirelessly communicates with one or more base stations. A wireless communication from a UE to a base station is referred to as an uplink communication. A wireless communication from a base station to a UE is referred to as a downlink communication. Resources are required to perform uplink and downlink communications. For example, a base station or a group of base stations may wirelessly transmit data to a UE in a downlink communication at a particular frequency for a particular duration of time. The frequency and time duration are examples of resources.

A base station allocates resources for downlink communications to the UEs served by the base station. The wireless communications may be performed by transmitting orthogonal frequency-division multiplexing (OFDM) symbols.

Some UEs served by a base station may need to receive data from the base station with lower latency than other UEs served by the base station. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to receive data with lower latency compared to the first UE. The second UE may also need to receive its data with higher reliability than the first UE. The second UE may be an ultra-reliable low latency communication (URLLC) UE, whereas the first UE may be an enhanced mobile broadband (eMBB) UE.

UEs that are served by a base station and that require lower latency downlink communication will be referred to as "low latency UEs". The other UEs served by the base station will be referred to as a "latency tolerant UEs". Data to be transmitted from the base station to a low latency UE will be referred to as "low latency data", and data to be transmitted from the base station to a latency tolerant UE will be referred to as "latency tolerant data."

SUMMARY OF THE INVENTION

Technical advantages are generally achieved, by embodiments of this disclosure which describe a system and method for enabling reliable and low latency communication.

In accordance with an embodiment, a method for wireless communications is provided, as may be performed by a user equipment (UE). In this example, the method includes receiving a first signal over first resources assigned to carry a first downlink transmission from a base station. The method further includes receiving a first downlink control indication (DCI) message from the base station. The first DCI message includes a pre-emption region (PR) indication and a PR bitmap, the PR indication indicates a location of a time-frequency region, and the PR bitmap includes bits associated with different portions of the time-frequency region. Each of the bits in the PR bitmap indicates whether a preemptive downlink transmission is present in the corresponding portion of the time-frequency region. An apparatus for performing this method is also provided. In one example, the time-frequency region associated with the PR indication is a sub-region of a pre-configured time-frequency region. In such an example, the PR bitmap includes a fixed number of bits, and wherein the time-frequency region associated with the PR indication is smaller than the pre-configured time-frequency region, thereby increasing the granularity in which the PR bitmap identifies preemptive downlink transmissions. In that example, or another example, the PR indication indicates a starting location or ending location of the time-frequency region. Optionally, in any one of the preceding examples, or in another example, the PR indication indicates a starting frequency or ending frequency of the time-frequency region. Optionally, in any one of the preceding examples, or in another example, the PR indication indicates a duration of the time-frequency region in the time domain.

Optionally, in any one of the preceding examples, or in another example, the PR indication field indicates a bandwidth of the time-frequency region. Optionally, in any one of the preceding examples, or in another example, the first DCI message further includes a bitmap configuration of the PR bitmap, the bitmap configuration identifying a number of bits in the PR bitmap that are mapped to different time-domain resources of the time-frequency region and a number of bits in the PR bitmap field that are mapped to different frequency-domain resources of the time-frequency region.

Optionally, in any one of the preceding examples, or in another example, the method further comprises receiving a second signal over resources assigned to carry a second downlink transmission from the base station, and receiving a second DCI message from the base station. The second DCI message includes a PR indication indicating a location of a second time-frequency region, wherein the second time-frequency region has a different duration or bandwidth than the time-frequency region. Optionally, in any one of the preceding examples, or in another example, the PR indication field and the PR bitmap field in the first DCI message are UE-specific fields. Optionally, in any one of the preceding examples, or in another example, the PR indication field and the PR bitmap field in the first DCI message are Group-specific fields. Optionally, in any one of the preceding examples, or in another example, the first DCI message is received after the first transmission.

In accordance with an embodiment, an apparatus for a method for m wireless communications is provided, as may be performed by a base station (BS). In this example, the method includes transmitting a first signal over first resources assigned to carry a first downlink transmission to a user equipment (UE). The method further includes transmitting a first downlink control indication (DCI) message to the UE. The first DCI message includes a pre-emption region (PR) indication and a PR bitmap, the PR indication indicates a location of a time-frequency region, and the PR bitmap includes bits associated with different portions of the time-frequency region. Each of the bits in the PR bitmap indicates whether a preemptive downlink transmission is present in the corresponding portion of the time-frequency region. An apparatus for performing this method is also provided. In one example, the time-frequency region is determined based on the preemptive downlink transmission. In that example, or another example, the time-frequency region associated with the PR indication is a sub-region of a pre-configured time-frequency region. In such an example, the PR bitmap includes a fixed number of bits, and the time-frequency region associated with the PR indication is smaller than the pre-configured time-frequency region, thereby increasing the granularity in which the PR bitmap identifies preemptive downlink transmissions.

Optionally, in any one of the preceding examples, or in another example, the PR indication indicates a starting location or ending location of the time-frequency region. Optionally, in any one of the preceding examples, or in another example, the PR indication indicates a starting frequency or ending frequency of the time-frequency region. Optionally, in any one of the preceding examples, or in another example, the PR indication indicates a duration of the time-frequency region in the time domain. Optionally, in any one of the preceding examples, or in another example, the PR indication field indicates a bandwidth of the time-frequency region.

Optionally, in any one of the preceding examples, or in another example, the first DCI message further includes a bitmap configuration of the PR bitmap, the bitmap configuration identifying a number of bits in the PR bitmap that are mapped to different time-domain resources of the time-frequency region and a number of bits in the PR bitmap field that are mapped to different frequency-domain resources of the time-frequency region. Optionally, in any one of the preceding examples, or in another example, the method further comprises transmitting a second signal over resources assigned to carry a second downlink transmission from the base station, and transmitting a second DCI message from the base station, the second DCI message including a PR indication indicating a location of a second time-frequency region. The second time-frequency region has a different duration or bandwidth than the time-frequency region.

Optionally, in any one of the preceding examples, or in another example, the PR indication field and the PR bitmap field in the first DCI message are UE-specific fields. Optionally, in any one of the preceding examples, or in another example, the PR indication field and the PR bitmap field in the first DCI message are Group-specific fields. Optionally, in any one of the preceding examples, or in another example, the first DCI message is received after the first transmission.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 11 illustrates an embodiment adaptive notification of a pre-emption region (PR).

FIG. 12 illustrates an embodiment non-contiguous PR.

FIG. 15 illustrates an embodiment UE behavior when monitoring GC DCI with common information.

FIG. 17 illustrates a diagram of an embodiment processing system.

FIG. 18 illustrates a diagram of an embodiment transceiver.

FIG. 19 is a flowchart of an embodiment method for a UE to perform wireless communications.

FIG. 20 is a flowchart of an embodiment method for a base station to perform wireless communications.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 1:
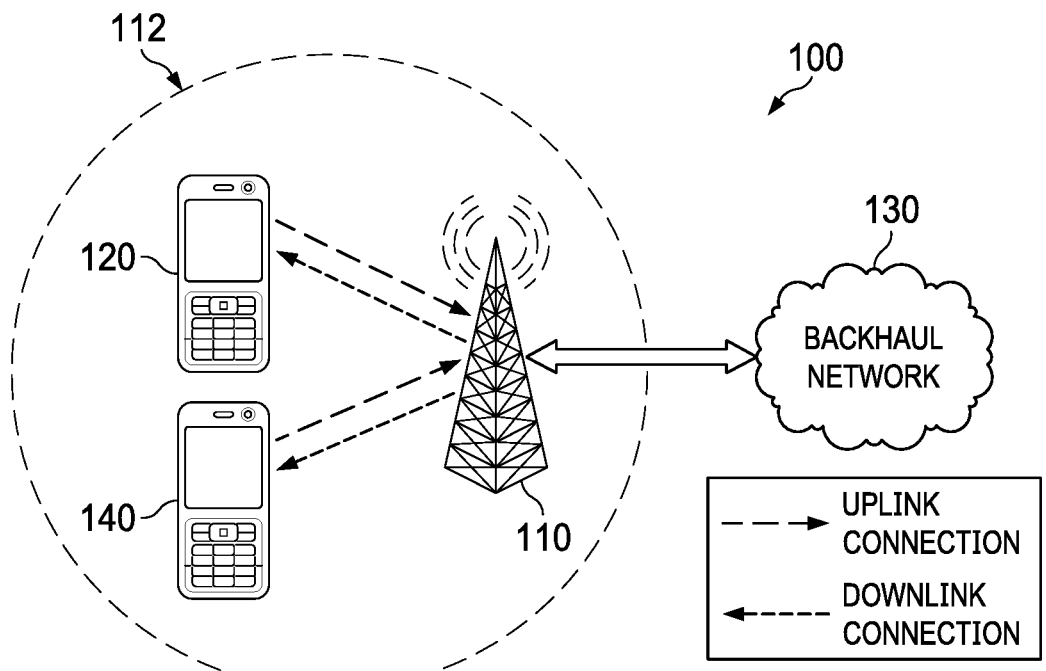
FIG. 1 illustrates a network for communicating data.

FIG. 1 illustrates a network 100 for communicating data. The network 100 comprises a base station 110 having a coverage area 112 a plurality of mobile devices 120 and 140, and a backhaul network 130. As shown, the base station 110 establishes uplink (dashed line) and/or downlink (dotted line) connections with the mobile devices 120 and 140, which serve to carry data from the mobile devices 120 and 140 to the base station 110 and vice-versa. Data carried over the uplink/downlink connections may include data communicated between the mobile devices 120 and 140, as well as data communicated to/from a remote-end (not shown) by way of the backhaul network 130. As used herein, the term "base station" refers to any component (or collection of components) configured to provide wireless access to a network, such as an enhanced Node B (eNB), a macro-cell, a femtocell, a Wi-Fi access point (AP), or other wirelessly enabled devices. The terms "eNB" and "base station" are used interchangeably throughout this disclosure. A base station or a group of base stations may alternatively be called a gNB in a new radio (NR) context. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc over licensed or unlicensed spectrum. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

The mobile device or UE 120 may be a low latency UE, and the mobile device or UE 140 may be a latency tolerant UE. That is, UE 120 may require lower latency downlink communication compared to UE 140. For example, UE 120 may be a URLLC UE, and UE 140 may be an eMBB UE. It should be understood that references to URLLC and eMBB in this disclosure are only examples of low latency traffic and latency tolerant traffic, and that the principles described herein are equally applicable to any two traffic types (and/or UE types) having different latency requirements. Some examples include low latency traffic not requiring high reliability and latency tolerant traffic with less stringent reliability requirement. Some use cases which may have particular latency requirements also include massive machine type communication (mMTC) and/or narrowband IoT. It is understood that schemes discussed herein may also relate to the examples mentioned above or other examples, wherever applicable. Although the base station 110 only serves two UEs in FIG. 1, in actual operation the base station 110 may serve many more UEs. It is also contemplated that a single UE 120, 140 may be served by more than one base station 110. Downlink transmissions to the latency tolerant UEs are typically grant-based, but may also be performed without a grant (e.g. grant-free) as well. Similarly, downlink transmissions to the low latency UEs may be performed with or without a grant.

When the base station 110 has data to transmit to UEs 120 and/or 140, the base station 110 transmits this data in one or more downlink transmissions using allocated resources, for example time/frequency resources. Specific resource partitions may be assigned for transmissions to UEs 12o, 140. A portion of the time/frequency resources may be used for the downlink transmission of low latency data (e.g. to URLLC UE 120), and this portion may be referred to as the low latency resources. Some other portion of the time/frequency resources may be used for the downlink transmission of latency tolerant data (e.g. to eMBB UE 140), and this portion may be referred to as the latency tolerant resources. The portion of resources used as low latency resources may change dynamically or semi-statically over time, e.g. based on factors such as traffic load, bandwidth requirements, and latency. It is important to note that latency tolerant resources and low latency resources are only examples of different types of resources. Generally, the principles described herein may also apply to any two types of resources which may be used for different types of traffic having different latency or having different quality of service (QoS) requirements.

Low latency data may be bursty or sporadic in nature, and may be transmitted in short packets. It may be inefficient to dedicate resources for low latency data. Therefore, a coexistence region may be defined in which a resource assignment for latency tolerant traffic overlaps with resource assignment for low latency traffic in the time and frequency domains. Latency tolerant UEs may monitor low latency traffic presence during their transmission if they are scheduled in resources that overlap with the coexistence region. In another example, no specific coexistence region may be reserved. Coexistence may happen dynamically within shared time-frequency resources within a carrier bandwidth (BW). Furthermore, it is also possible that coexistence resources may span multiple carrier BWs.

Existing technologies may utilize indication-based downlink (DL) multiplexing. Possible signaling solutions for implicit and explicit indications of low latency traffic during and/or after the impacted transmission of latency tolerant traffic may be desirable. Proposed solutions may use interleaving the code blocks of latency tolerant traffic, and latency tolerant-transport block (TB) mapping may also be updated for better coexistence experience.

The low latency resources may be partitioned into transmission time units (TTUs). A TTU of the low latency resources may be referred to as a "low latency TTU". A TTU may be a unit of time that can be allocated for a particular type of transmission, for example a low latency data transmission. The transmission can be scheduled or unscheduled. In some embodiments, a TTU is the smallest unit of time that can be allocated for a transmission of a particular type. Also, a TTU is sometimes referred to as a transmission time interval (TTI). In other embodiments, a low latency TTU includes an integer number of symbols for a given numerology.

The latency tolerant resources may be partitioned into scheduling intervals, and a scheduling interval of the latency tolerant resources may be referred to as a "latency tolerant UE scheduling interval". A latency tolerant UE scheduling interval is the smallest interval of time that may be scheduled for a data transmission to a latency tolerant UE. A latency tolerant scheduling interval may also be referred to as a latency tolerant TTU. A latency tolerant TTU may span one or multiple symbols/slots of a given numerology. For example, a latency tolerant TTU can be 1 ms consisting of 14 symbols based on 15 kHz subcarrier spacing. If a slot is defined as 7 symbols, then in this example, a latency tolerant TTU or scheduling interval spans two slots. A low latency TTU may have a duration that is shorter than a latency tolerant TTU. By transmitting transport block (TBs) of a shorter duration in the low latency resources, the latency of the data transmissions to the low latency UEs may be reduced.

In some embodiments, the low latency resources have a numerology that is different from the numerology of the latency tolerant resources, e.g. the subcarrier spacing of the low latency resources is different from the subcarrier spacing of the latency tolerant resources. The low latency resources may have a subcarrier spacing that is larger than the subcarrier spacing of the latency tolerant resources. For example, the subcarrier spacing of the low latency resources may be 60 kHz, and the subcarrier spacing of the latency tolerant resources may be 15 kHz. By using larger subcarrier spacing, the duration of each OFDM symbol in the low latency resources may be shorter than the duration of each OFDM symbol in the latency tolerant resources. Latency tolerant TTUs and low latency TTUs may include the same number of symbols, or different numbers of symbols. The symbols in latency tolerant TTUs and low latency TTUs may have the same numerology, or different numerologies. If a TTU is defined as having a fixed number of OFDM symbols regardless of numerology, then more than one low latency TTU can be transmitted during a latency tolerant UE scheduling interval. For example, the latency tolerant UE scheduling interval may be an integer multiple of the low latency TTU. The length of symbols in a latency tolerant TTUs and/or low latency TTU may be varied by changing the length of a cyclic prefix in the latency tolerant TTUs and/or low latency TTU. In other embodiments, the low latency resources and the latency tolerant resources have the same numerology. A low latency TTU may then be defined to have fewer OFDM symbols compared to the number of OFDM symbols in a latency tolerant UE scheduling interval, such that there will still be more than one low latency TTU within a latency tolerant UE scheduling interval. For example, the duration of a low latency TTU may be as short as a single OFDM symbol. It is also contemplated that the low latency transmission and the latency tolerant transmission may not have the same number of symbols per TTU, whether or not they have the same numerology. If different numerology is used, the symbols of a low latency TTU may align at the boundary of the one or multiple symbols of the latency tolerant TTU with same or different CP overheads.

A TTU may be divided into a number of slots, for example 20 slots. A low latency slot duration may be equal to or shorter than a latency tolerant slot or a long-term evolution (LTE) slot. A mini-slot may contain any number of symbols that is fewer than the number of symbols in a slot, e.g., 1, 3, 6 symbols if a slot is 7 symbols.

Figure 2:
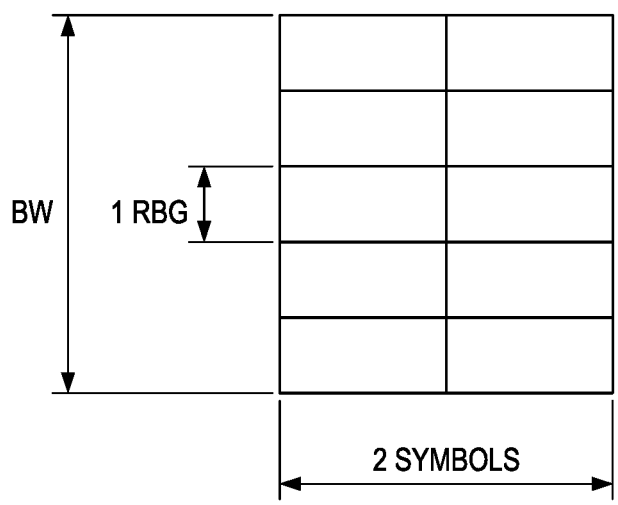
FIG. 2 illustrates an embodiment of mini-slot architecture.

FIG. 2 illustrates an embodiment mini-slot architecture. In this example, a mini-slot spans two symbols. A low latency TTU may include physical control format indicator channel (PCFICH) or physical hybrid automatic repeat request (ARQ) indicator channel (PHICH). Alternatively, PCFICH and/or PHICH indicators may be excluded from a low latency TB. Control information of a low latency TTU may be limited to the first symbol. Resource elements (Res) containing control information for low latency traffic may or may not be contiguous. The same demodulation reference signal (DMRS) may be used for low latency control information and data. As time-domain granularity is short, multiple resource blocks can be grouped for minimum resource granularity when mini-slot is scheduled. Resource block group (RBG) based resource allocation granularity may be based on compact downlink control information (DCI) or 1 RBG with minimum granularity.

DMRS may be front-loaded or distributed over the mini-slot duration. A higher aggregation level of control channel element (CCE) in a physical downlink control channel (PDCCH) may be supported, and fewer UEs may be scheduled per mini-slot for more reliability.

Figure 3:
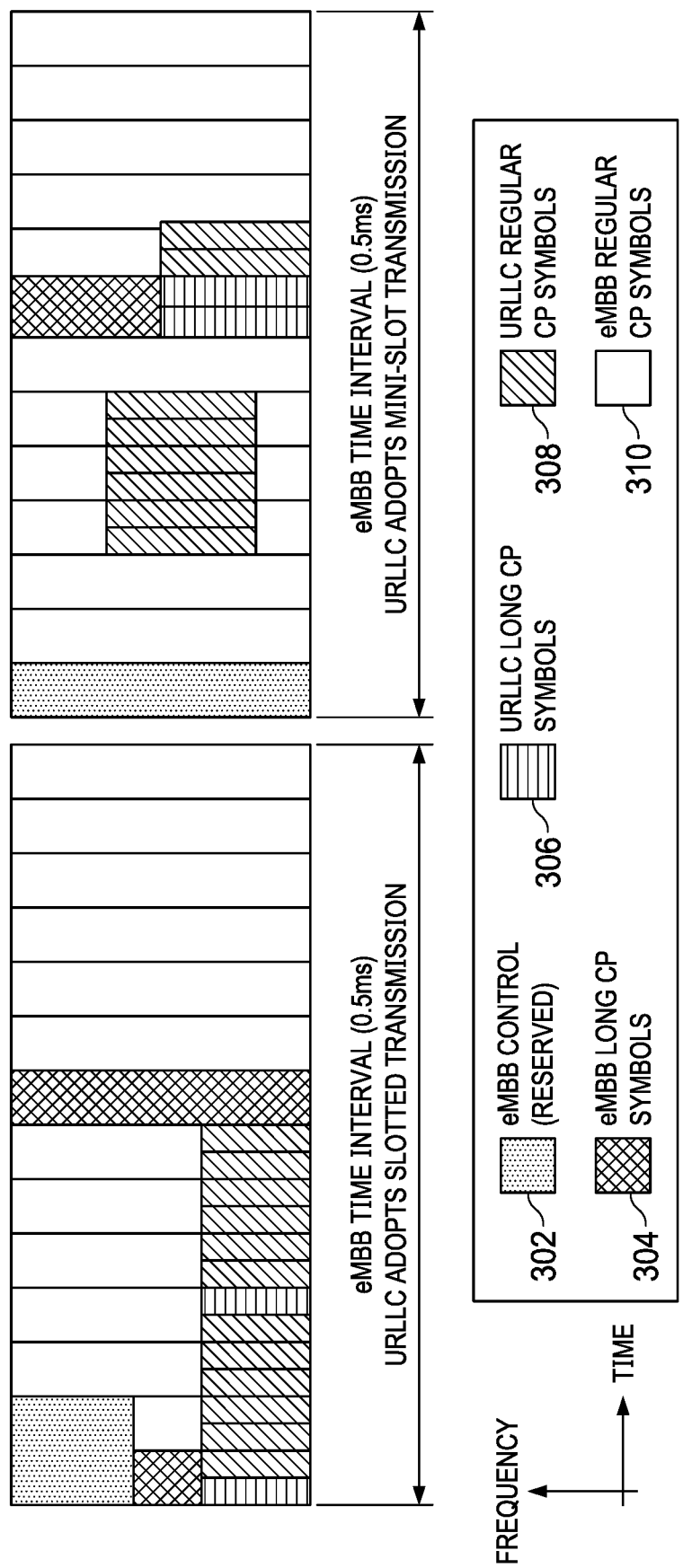
FIG. 3 illustrates an embodiment structure of mini-slots.

FIG. 3 illustrates an embodiment structure of mini-slots. The low latency mini-slot may have a numerology that is different from the numerology of the latency tolerant resources. The transmission of low latency data may be slot-based or mini-slot based. For example, the latency tolerant transmission may have a time duration long enough to contain more than one low latency transmission. Examples of low latency TTU durations and an example of a latency tolerant UE scheduling interval are shown. The eMBB control information 302 may be reserved at the beginning of a single slot or a set of consecutive slots. A long cyclic prefix (CP) eMBB symbol 304 may be slightly longer than a regular-CP eMBB symbol 310; a long-CP URLLC symbol 306 may be slightly longer than a regular-CP URLLC symbol 308. As shown in FIG. 3, a low latency symbol or URLLC symbol may not span the whole bandwidth of a latency tolerant symbol or eMBB symbol. In the example time/frequency resources shown in FIG. 3, specific resource partitions are scheduled for transmissions to latency tolerant UEs and low latency UEs. However, the illustrated resource partitions are only an example. Also, in addition to time/frequency resources, other resources may be allocated for transmission to the latency tolerant UEs and low latency UEs, such as code, power, and/or spatial resources.

Figure 4:
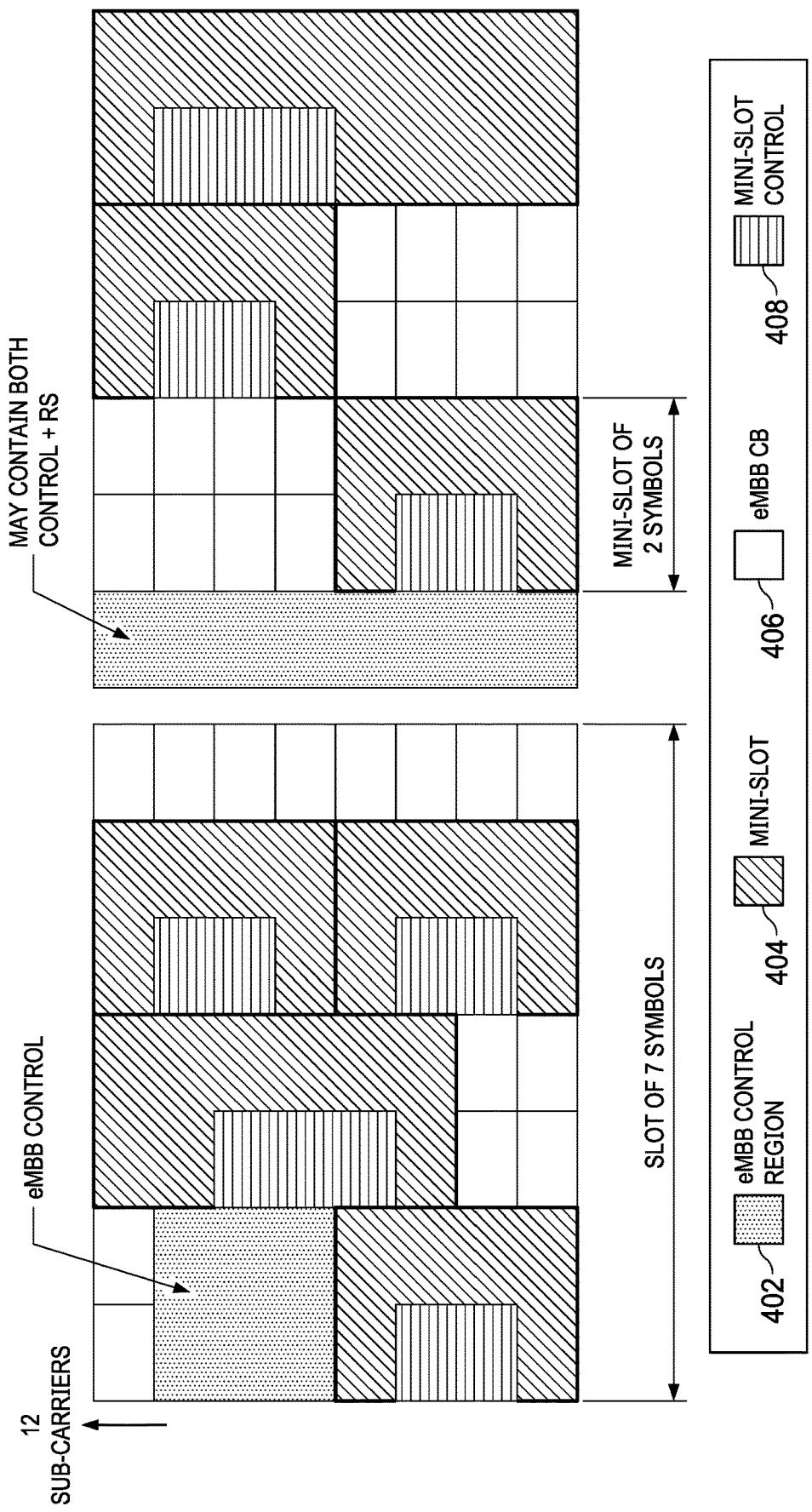
FIG. 4 illustrates two embodiment starting positions of mini-slots.

FIG. 4 illustrates two embodiment starting positions of mini-slots. The starting position of the mini-slot in time and/or frequency domain depends on the frame structure of the slot/TTU used for latency tolerant transmission. For example, the frame structure consists of a control channel field, a data channel field, and pilot field of a slot. The starting position of the mini-slot may be orthogonal to the control channel field and/or pilot field of a slot to avoid performance degradation of the slotted transmission of latency tolerant traffic. Depending on whether latency tolerant control information 402 spans one or two symbols, latency tolerant control information 401 may not fully occupy the first symbol of a latency tolerant slot. The mini-slot 404 may start at the first symbol of a latency tolerant slot, or the latency tolerant control and reference signal may fully occupy the first symbol, and the mini-slot 404 may start at the second symbol. Other examples are also possible. For example, a mini-slot may overlap a boundary between two slots such that it overlaps the last one or more symbols of the preceding slot and the first one or more symbols of the subsequent slot. In another embodiment, an ongoing latency tolerant transmission may be "punctured" by replacing a portion of the latency tolerant transmission with a low latency transmission (not shown in FIG. 4). Alternatively, instead of puncturing, the latency tolerant transmission and the low latency transmission may be superimposed on the same time-frequency resources, optionally with a power offset or other appropriate method for each intended receiver to identify and decode its corresponding transmission. The signaling methods described herein for punctured latency tolerant TBs may also be used to indicate superimposed low latency and latency tolerant transmissions.

Even though the description below may assume mini-slot based transmissions for low latency traffic, it is contemplated that the methods described herein can be applicable to other forms or types of low latency transmissions, including for example, a mini-slot or a slot format or an aggregation of mini-slots or slots of a numerology.

Indication of low latency traffic arrival/presence may be signaled via the resources normally reserved for control signaling in either transmission type, or by transmitting additional control signaling within the resources that would otherwise be allocated for data within the latency tolerant transmission. For example, different control messages may be used to indicate low latency and latency tolerant traffic when low latency traffic (e.g., URLLC traffic) arrives. Alternatively, a single control message may be used to indicate low latency and latency tolerant traffic at the end of a latency tolerant UE scheduling interval. Signaling of the low latency traffic may be explicit or implicit. For explicit indication, some REs (e.g., contained within one symbol or spanning multiple contiguous or non-contiguous symbols) may be used for signaling. In an embodiment, one or more REs of the latency tolerant traffic or eMBB symbols in which URLLC transmission occurs may be used for signaling. URLLC mini-slots may avoid using those REs for scheduling, e.g., URLLC traffic may be rate-matched for remaining REs. In another embodiment, REs that contain signaling do not overlap with the URLLC mini-slot resources. For example, the REs containing signaling may correspond to different time-frequency resources than the symbols containing the mini-slot. The signaling indicating the presence of low latency traffic and eMBB pilot signals may be scheduled over different resources. Alternatively, signaling indicating the presence of low latency traffic may be scheduled in one or more symbols containing eMBB pilot signals, but not in REs containing eMBB pilot signals. As yet another alternative, mini-slot signaling may be scheduled in REs containing eMBB pilot signals. When the mini-slot signaling is sent over the same time-frequency resources as eMBB pilot signals, in which case the mini-slot signaling and the eMBB pilot signals may be orthogonal in the code domain (e.g., using orthogonal cover codes) or through spatial multiplexing so that each receiver can identify and decode the transmission intended for it.

Alternatively, one or more REs of eMBB symbols at the end of an eMBB interval/TTU may be used to collect information of URLLC arrival during the whole interval. REs used for collective indication may puncture regular eMBB data, which together with other punctured data may be transmitted later.

For an implicit indication, existing eMBB control, URLLC control, DMRS, and/or other signaling may be used for indication of the presence of URLLC traffic. Either mini-slot resource or eMBB slot resource (e.g., eMBB pilot signals) may be utilized. For example, (part of) mini-slot control and/or DMRS may be blindly detected by eMBB UE for possible indication. If eMBB traffic is scheduled in multiple aggregated slots, then in each slot DMRS may signal whether or not that slot contains a low latency transmission. For example in each TTU/slot of latency tolerant transmission, a DMRS sequence is chosen by the base station based on whether low latency traffic is present or not. The latency tolerant receiver blindly detects which sequence is sent. In another example, a different pattern of DMRS can be sent if low latency traffic arrives.

Figure 5:
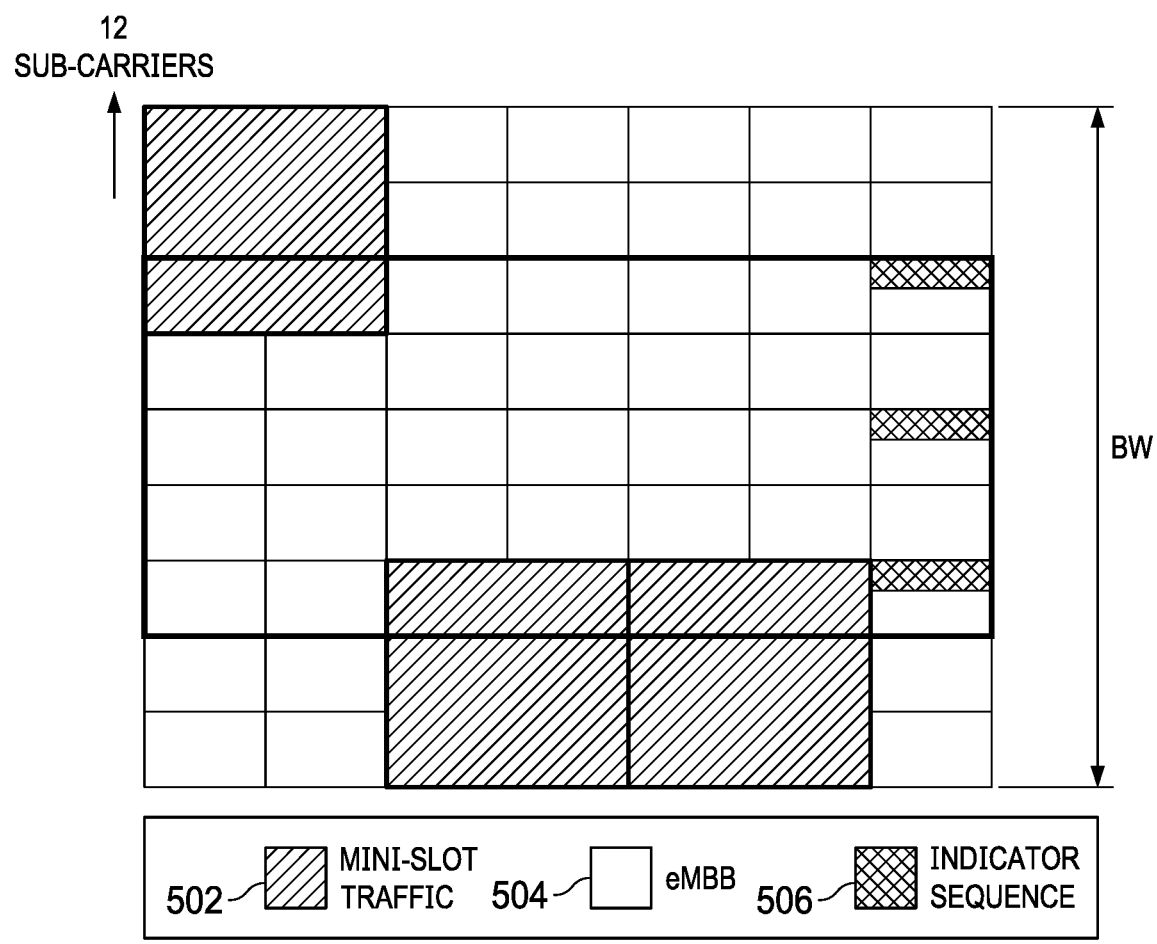
FIG. 5 illustrates an embodiment explicit post indication of mini-slot traffic.

FIG. 5 illustrates an embodiment for explicit post indication of mini-slot traffic. In this example, a mini-slot 502 duration is pre-configured and/or static; a starting location of the mini-slot is also pre-configured. An indicator sequence 506 may identify time and frequency resources reserved for mini-slot signaling. For example, if a latency tolerant transport block spans x number of mini-slot granularities in frequency and y number of mini-slot granularities in time, then post-indication may contain xy number of bits to identify which time-frequency areas are pre-empted. If overhead is a concern, only time and/or frequency domain pre-emption information can be conveyed. According to the above example, a post-indication may contain x bits (y bits) only if time (frequency) domain pre-emption information is provided. In another example, several time-frequency resources can be grouped and a group-based pre-emption indication can be provided, which may require less bits compared to the case when information of all time-frequency resource granularities within a latency tolerant TTU is conveyed.

As can be seen from the above, there are many ways of indicating to an eMBB UE the presence of low latency transmission (e.g. URLLC traffic) during a latency-tolerant transmission (e.g. eMBB). For example, a puncturing or pre-emption indication (PI) can be used. Alternatively or additionally, an indication may simply indicate whether a downlink transmission for the eMBB UE is present or not. Alternatively or additionally, an indication of whether a (preemptive) low-latency transmission for another UE (e.g. a URLLC UE) is present may be used. For example, an indication that a latency-tolerant transmission for the eMBB UE is present may also be an indication that a (preemptive) low-latency transmission for another UE (e.g. a URLLC UE) is not present and conversely, an indication that a latency-tolerant transmission for the eMBB UE is not present may also be an indication that a (preemptive) low-latency transmission for another US (e.g. URLLC UE) is present. Other possibilities exist for the indication.

Figure 6:
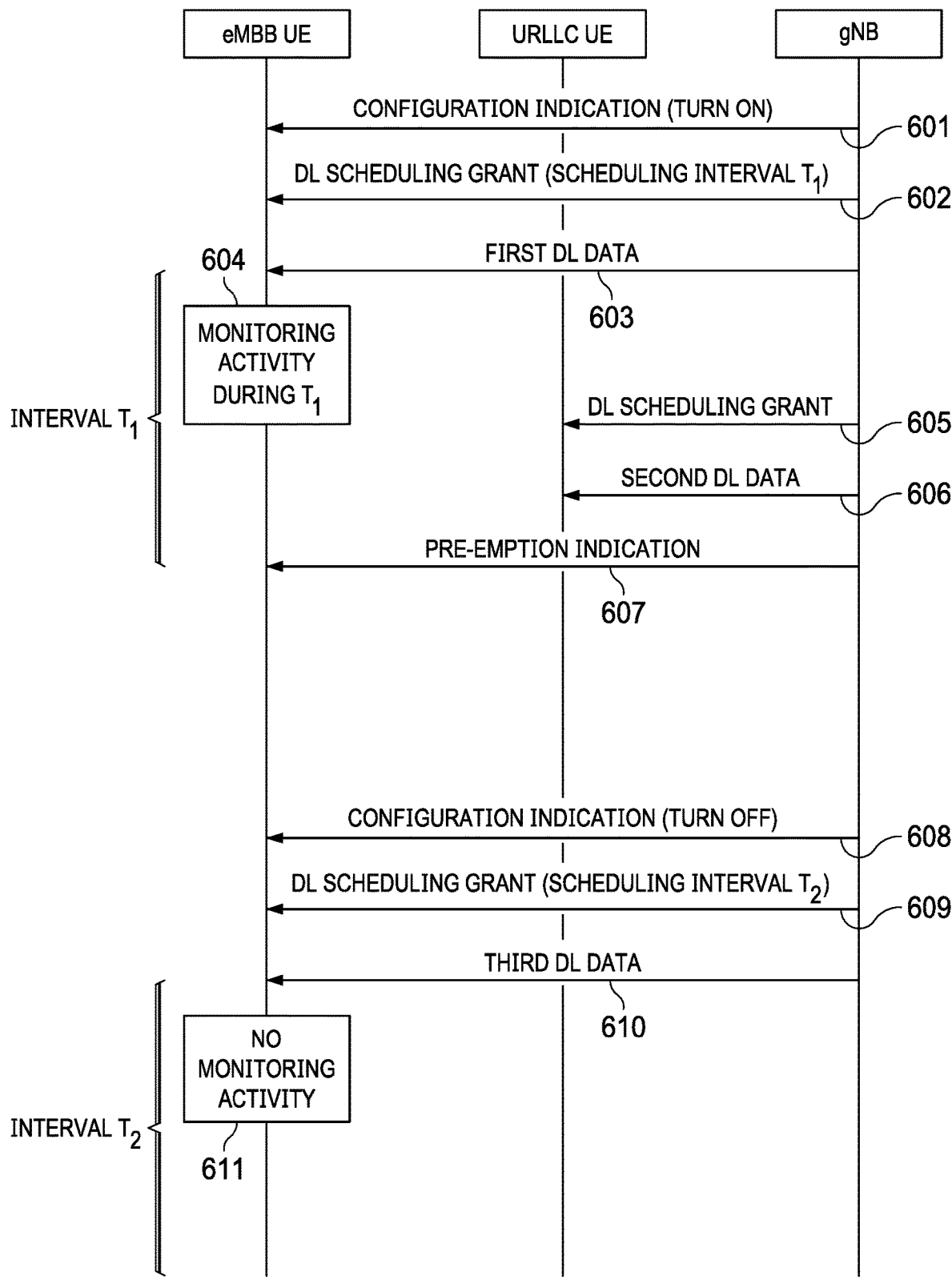
FIG. 6 illustrates an embodiment flow chart of a communication scheme with low latency traffic indication.

FIG. 6 illustrates an embodiment flow of a communication scheme using puncturing or pre-emption indications (PIs) to indicate to a latency tolerant UE the presence of second data (e.g. low latency data) intended for a low latency UE on resources scheduled for first data (e.g. latency tolerant data) intended for the latency tolerant UE. As shown in FIG. 6, a configuration indication is transmitted from a gNodeB (gNB)/eNB to a latency tolerant UE such as an eMBB UE in step 601. The configuration indication may contain one or more parameters to enable the UE to properly handle PIs. For example, the configuration indication may be used to notify the eMBB UE that pre-emption may occur and/or to turn on or activate a monitoring function at the eMBB UE to monitor for one or more PIs that may indicate the presence of second data (e.g. low latency traffic) on resources assigned in DL scheduling grants for the eMBB UE. At step 602, the gNB may transmit a DL scheduling grant (e.g., for scheduling interval T1) to the eMBB UE, and at step 603, the gNB may transmit first DL data (e.g., latency tolerant data) to the eMBB UE. The indication and grant in steps 601 and 602 may be transmitted in different messages or in one message. As shown in step 604, the eMBB UE may monitor for PIs during a monitoring period T1 which, in the example of FIG. 6 is equal to the scheduling interval T1. In other embodiments, for example when the PI is a group common indication, the monitoring period may be different from a scheduling interval (e.g., greater or shorter) and, for example, span multiple scheduling intervals or just a portion of one interval. In some embodiments, the configuration indication specifies the monitoring period. The monitoring activity may begin at different points in time, for example, immediately after the eMBB UE is scheduled, after some offset of X symbols or slots from the time when the downlink grant is received (e.g. step 602) or after the scheduled transmission ends. The PI may be configured with a monitoring periodicity for example to enable the eMBB UE to monitor for PIs in Y number of occasions/times after the UE is scheduled. The value of Y can be configured via the configuration indication and the configuration may be semi-statically or dynamically performed. The value of Y may depend on the transmission duration and/or the frequency resources occupied by the transmission and/or interval between consecutive monitoring occasions. The interval of successive monitoring occasions is Z slot(s) or symbols(s) or ms that can also be configured. As will be described below in further detail, other configuration parameter(s) may also be transmitted in the configuration indication to properly configure the eMBB UE for pre-emption events.

At step 605, the gNB may transmit a DL scheduling grant to a low latency UE such as a URLLC UE, and at step 606, the gNB may transmit second DL data (e.g., low latency data) to the URLLC UE. At step 607, one or multiple PIs (only one shown) may be transmitted by the gNB to the eMBB UE to indicate the presence of second data (e.g. low latency traffic on resources identified in the DL scheduling grant transmitted at step 603.

At step 608, another configuration indication is transmitted from the gNodeB to the eMBB UE, e.g., prompting the eMBB UE to turn off or deactivate the monitoring function for pre-emption indications during a no-monitoring period T2, which, in the example of FIG. 6 is equal to the scheduling interval T2. In other examples, the no-monitoring period may be different from a scheduling interval (e.g., greater or shorter) and, for example, span multiple scheduling intervals T2 or just a portion of one interval T2. In some embodiments, the configuration indication shown at step 608 may include the same or a different set of configuration parameters and/or may have the same or a different format than that of the configuration indication shown at step 601. At step 609, the gNB may transmit a DL scheduling grant (e.g., for scheduling interval T2) to the eMBB UE, and at step 610, the gNB may transmit third DL data (e.g., latency tolerant data) to the eMBB UE. The indication and grant in steps 608 and 609 may be transmitted in different messages or in one message. Since the eMBB UE received the configuration indicator to turn off its monitoring function, the eMBB UE does not, during interval T2, monitor for pre-emption indicators as shown in step 611.

In some embodiments, the configuration indication includes one or more parameters to enable the eMBB UE to properly handle preemptive transmissions or events which may be indicated by PIs the eMBB subsequently receives. As will be explained below in further detail, the PI includes an indication of a time and/or frequency pre-emption region (PR) and a bitmap of bits associated with different portions of the PR and each indicating whether a preemptive transmission is present in the corresponding portion of the PR.

Figure 7:
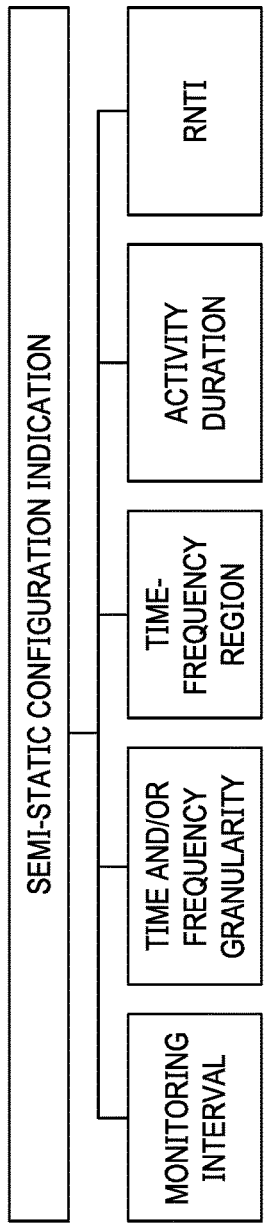
FIG. 7 illustrates an embodiment structure of a semi-static pre-emption indication/indicator (PI).

FIG. 7 illustrates an embodiment structure of a configuration indication. In some embodiments, the configuration indication is transmitted to the eMBB UE using for example an RRC message or other type of semi-static or higher layer signaling. In the example of FIG. 7, a semi-static configuration indication includes a monitoring interval indication field, a time and/or frequency granularity indication field (e.g. containing a time and/or frequency resolution for the bits in the PR bitmap (further details below)), a time-frequency region (i.e., the PR) indication field, an activity duration field (e.g. containing a duration when the configuration is valid, and/or a radio network temporary identifier (RNTI) field. The configuration indication may further include a notification of the PR bitmap format for a given N bits of payload. For example, N=xy bits, where x is the number of time granularities/divisions and y is the number of frequency granularities/divisions. Values of x and y may also be included in the configuration indication. Different values of pair {x, y} are possible which all have xy=N bits. The configuration indication may also notify the eMBB UE how a two dimensional PR bitmap is converted into an N bit bitmap.

In one example, the PR bitmap has N=16 bits, which corresponds to a PR which is divided into 16 resource units and each bit represents one resource unit. In Table I, resource unit indices are shown, where columns indicate time granularities and rows indicate frequency granularities. There are four time x=4 and four frequency y=4 granularities configured.

TABLE I

|    | t1 | t2 | t3 | t4 |
|----|----|----|----|----|
| f1 | 1  | 2  | 3  | 4  |
| f2 | 5  | 6  | 7  | 8  |
| f3 | 9  | 10 | 11 | 12 |
| f4 | 13 | 14 | 15 | 16 |

There are different ways the bits representing different resource units can be grouped into N bits. In one example, N bits are organized as [f1, f2, f3, f4], i.e., [1, 2, 3, 4, 5, . . . , 8, 9, . . . , 12, 13, . . . , 16](entries are appended one row after another) or [t1, t2, t3, t4], i.e., [1, 5, 9, 13, 2, . . . , 14, 3, . . . , 15, 4, . . . , 16] (entries are appended one column after another). Here, 16 bits and x=4 and y=4 is used only as an example. In practice, x and y can be any positive integers and similar mapping or conversion technique can be applied for any combination of pair {x, y}. There may be other alternative ways to group the bits representing the units, with different interleaving patterns, and this is notified to the UE.

The configuration indication may also notify the eMBB UE how many or at which occasions the eMBB UE needs to monitor for PIs. As mentioned above, an eMBB UE may monitor PIs at Y number of occasions in time and/or frequency. The exact value of Y may be explicitly notified via semi-static signaling (e.g. RRC) or can be implicitly derived from the transmission duration and/or the location and number of RBs assigned for data transmission and/or location of PDCCH monitoring occasion for DL grant relative to PDCCH monitoring occasions for PIs.

As noted above, in one embodiment, it is possible that all the parameters in the configuration indication are grouped and sent in one configuration indication message. Alternatively, the one or more parameters can be sent in different signaling messages using semi-static or dynamic signaling (e.g. DCI). The semi-static signaling options include broadcast signaling such as MIB or SIB or UE specific RRC signaling. Other group-based or cell-specific RRC signaling is also possible. For example, monitoring periodicity (i.e., interval of configured location/search spaces) of a group-common PI may be notified via MIB or SIB, whereas other parameters may be notified in different stages of RRC signaling. Alternatively, if only a select group of UEs are configured to monitor, then UE specific or group-based RRC signaling can be used.

Referring back to FIG. 7, the time and/or frequency granularity information may comprise a PR bitmap (further details below), and the time-frequency region may comprise a scope of the pre-emption indication. In an embodiment, the bitmap may correspond to a time-frequency region that includes or excludes reserved or unused resources. The time-frequency region, i.e., pre-emption region can be contiguous or non-contiguous. When a UE receives a PI associated with a downlink transmission, the UE may store the received transmission signal in a buffer, and drop or otherwise discard from the buffer the bits or symbols of the received signal that were received over portions of the time-frequency region in which preemptive downlink transmissions (e.g., URLLC transmission) are indicated as being present by the PR bitmap field. Alternatively, in embodiments where the UE receives the PI during the pre-emption event, the UE may store a subset of bits or symbols of the received signal in a buffer without storing, in the buffer, bits or symbols of the received signal that were received over portions of the time-frequency region in which preemptive downlink transmissions are indicated as being present by the PR bitmap field.

In some implementations, the use of semi-static configuration indications as described above may not sufficiently account for the variety and number of low latency transmissions that may pre-empt latency tolerant transmissions. For example, depending on the scheduling load, quality of service requirements, or available resources, low latency transmissions may be scheduled dynamically over many different time-frequency regions, either grouped in a particular area where, for example, a small number of eMBB UEs may be impacted or spread over many different regions affecting a greater number of UEs. In those situations, if the configuration of the PIs does not change sufficiently rapidly (e.g. semi static), or if the resolution provided by the PR bitmap in the PI is too coarse or if the coverage provided by the PR bitmap is too large, the PIs may inadvertently notify some eMBB UEs that their downlink transmissions have been pre-empted when in fact they haven't. This may be particularly true where the configuration indication and PIs serve a group of UEs and/or the number of bits used in the PR bitmap is small.

Figure 8:
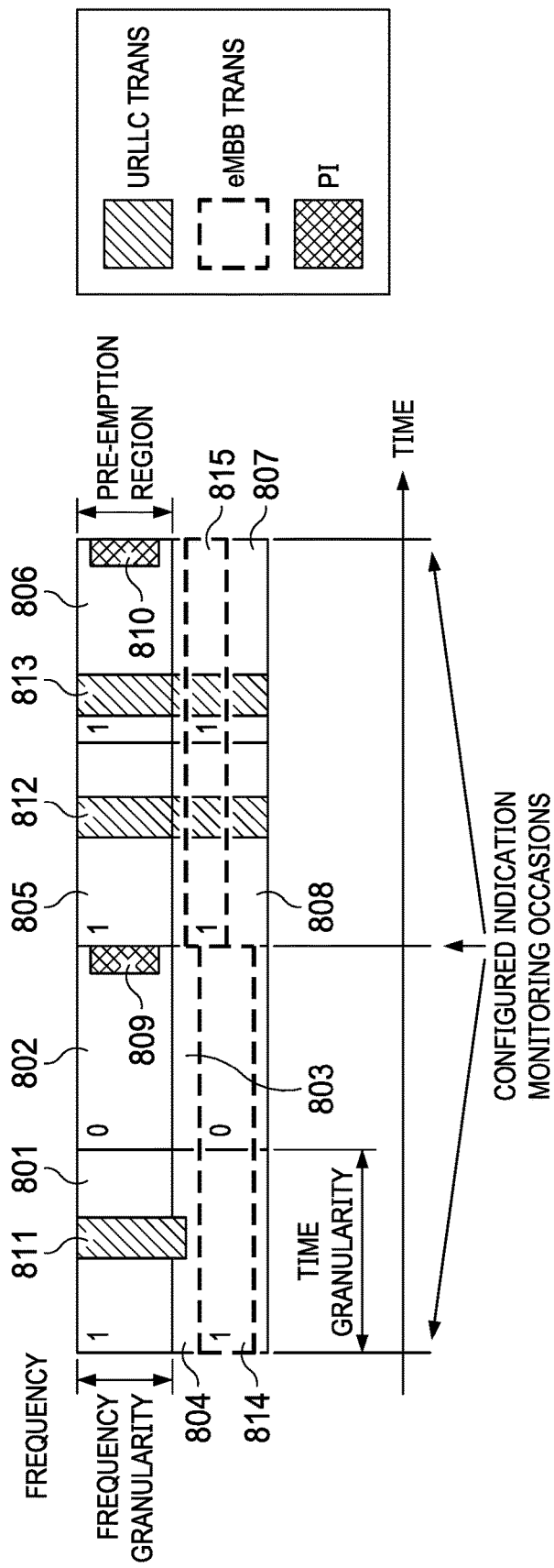
FIG. 8 illustrates two embodiment PIs of mini-slot traffic.

FIG. 8 illustrates two pre-emption indications (PIs) 809, 810 of low latency traffic, where each PI corresponds to a time-frequency region (i.e. a PR) that is divided into two frequency partitions and two time partitions. In the example of FIG. 8, it is assumed that the PIs have been (pre-) configured by a semi-static configuration indication. In this example, the PIs 809, 810 each includes a 4-bit bitmap, where each bit corresponds to a particular time-frequency portion of the PR and indicates whether pre-emption has occurred or not. The PR bitmap of PI 809 addresses sub-regions 801-804 and the PR bitmap of PI 810 addresses sub-regions 805-808. Each bit of the PR bitmap in each of the PIs 809-810 corresponds to a particular sub-region and indicates the presence or absence of URLLC data or whether the sub-region is pre-empted or not. A first eMBB transmission 814 occurred during the first to second time partitions, and a second eMBB transmission 815 occurred during the third to fourth time partitions. First and second time partitions is addressed by PI 809, whereas third and fourth time partitions are addressed by PI 810.

As can be seen, a first URLLC data transmission 811 occurred in the time-frequency sub-regions 801 and 804, and the first PI 809 uses 1, 0, 0, and 1 to indicate the pre-emption status of each of the time-frequency sub-regions 801-804, respectively, using 1 to indicate the presence of the URLLC data transmission and 0 to indicate the absence of the URLLC data transmission. Similarly, a second and third URLLC data transmissions 812 and 813 occurred in the time-frequency sub-regions 805-808, and the second PI 810 uses 1, 1, 1, and 1 to indicate the pre-emption status of each of the time-frequency sub-regions 805-808, respectively.

While PI 810 accurately indicates the pre-emption status of the second eMBB transmission 815, the granularity or resolution of the PI 809 is such that it can indicate that the first eMBB transmission 814 is impacted by the URLLC transmission 811 but not that it is actually pre-empted. Thus, a dynamic PI configuration with an adaptive indication of the PR is beneficial to more accurately indicate pre-emption events.

There are many ways to dynamically and more accurately reflect the presence of different sets of low latency transmissions in latency-tolerant transmissions. In some embodiments, for each PI transmission that indicates the presence of certain low-latency transmissions, the PI includes both a bitmap of a PR that is sufficiently large to cover the impacted time-frequency resources and a PR indication that indicates time-frequency portions of the PR that correspond to the bits in the PR bitmap. The portions indicated may represent the entire PR or a part of a PR (a particular set of resources therein). The PR indication may for example include (or be indicative of) one or more of the following aspects or parameters, in any combination:

1) a location of the PR,
2) a time-frequency resolution (e.g. time-frequency granularity) of the PR bitmap,
3) a type or format of the PR bitmap, and
4) a number of bits used in the PR bitmap Any one of the parameters can be changed dynamically (e.g. at every PI transmission) depending on the number and placement of the low-latency transmissions relative to the on-going latency-tolerant transmissions. In other embodiments, any one of these parameters may be configured in advance with default or initial values e.g. via a (semi-static) configuration indication. With or without prior configuration, by including these parameters in the PI (using one or multiple fields), the time-frequency portions indicated by the bits in the PR bitmap may be changed dynamically, to more accurately indicate the presence of low-latency transmissions which may be scheduled dynamically in different time-frequency resources. In some embodiments, the PR frequency range is less or equal to a carrier BW and the PR duration may be equal or less than the PI monitoring period configured (e.g. via the configuration indication).

Figure 9:
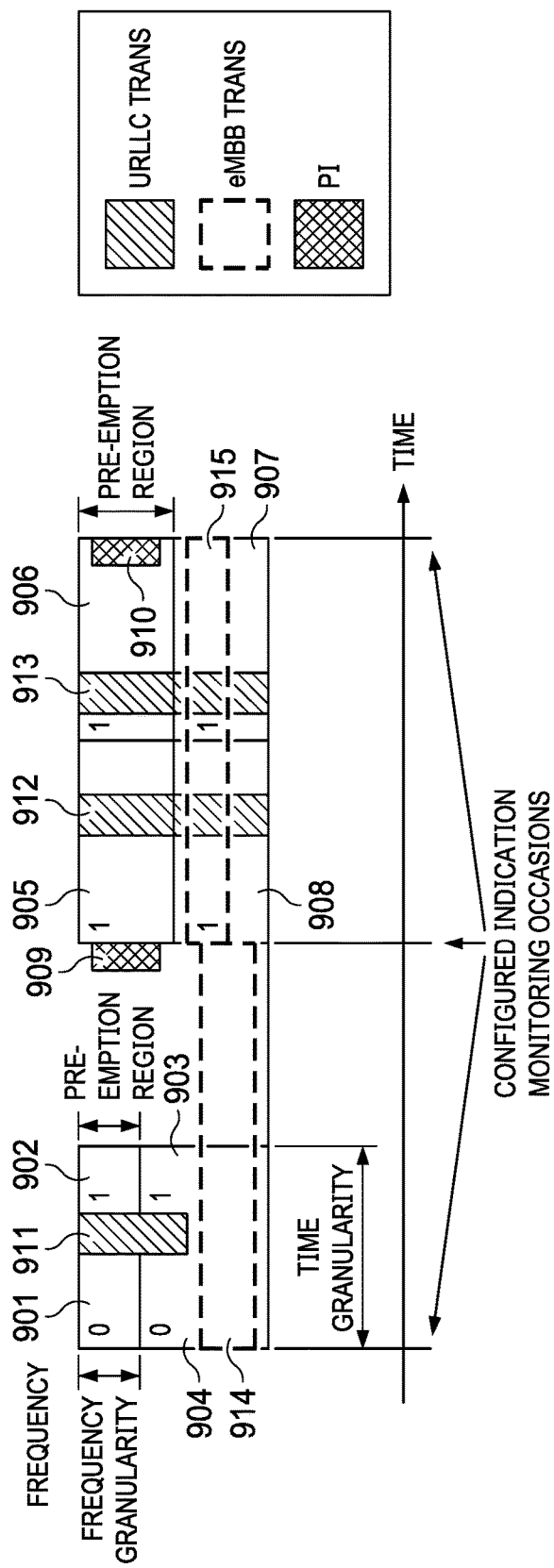
FIG. 9 illustrates another two embodiment dynamic PIs of mini-slot traffic.

FIG. 9 illustrates two PIs of low latency traffic corresponding to a first time-frequency region that is divided into two frequency partitions and two time partitions 901-904, and a second time-frequency region that is divided into two frequency partitions and two time partitions 905-908. There are eight sub-regions 901-908 and two four bit PIs 909-910 where each bit corresponds to a particular sub-region and indicates the presence or absence of URLLC data or whether the sub-region is pre-empted or not. A first eMBB transmission 914 occurred during the first to second time partitions (and longer than the first to second time partitions here), and a second eMBB transmission 915 occurred during the third to fourth time partitions. As can be seen, a first URLLC data transmission 911 occurred in the time-frequency sub-regions 902 and 903, and the first PI 909 uses 0, 1, 1, and 0 to indicate the pre-emption status of each of the time-frequency sub-regions 901-904, respectively. Similarly, a second and third URLLC data transmissions 912 and 913 occurred in the time-frequency sub-regions 905-908, and the second PI 910 uses 1, 1, 1, and 1 to indicate the pre-emption status of each of the time-frequency sub-regions 905-908, respectively. Compared to FIG. 8 or sub-regions of 905-908, the four sub-regions 901-904 are adaptive to the URLLC transmission 911, and are smaller than the sub-regions 801-804 or sub-regions 905-908. The PI 909 indicates the presence or absence of URLLC data with a finer granularity in the time-frequency domains than the PI 809 in FIG. 8, and more accurately indicates the presence of the URLLC data transmission 911. A PR indication or notification of the PR sent as part of the PI 909 may adaptively configure one or more aspects of a PR (e.g. location, resolution, format, number of bits) resulting in more accurate notification of pre-emption events and potentially less actual eMBB transmissions impacted.

In some embodiments, a UE-specific or group-common downlink control information (DCI) can be used for PI transmissions and each PI may include a bitmap of a PR that is sufficiently large to cover the impacted time-frequency resources and a PR indication in the form of or more fields that indicates the time-frequency portions of the PR that correspond to the bits in the PR bitmap. The PR may alternatively be called a pre-emption indication region or coexistence region or impacted region.

In some embodiments, a DCI message is transmitted that notifies the region (i.e., the pre-emption region PR) where pre-emption events occurred and the bitmap of pre-emption information providing status of pre-emption in different portions of the region. The DCI message can dynamically update one or multiple configuration parameters of PI, e.g., location of PR, i.e., starting/ending positions in time/frequency with respect to a reference point and/or duration of PR and/or time and/or frequency granularity (i.e., resolution of a bit in bitmap) of PI and/or number of partitions in time and/or frequency within the PR (i.e., format of bitmap x by y, values of x and/or y). Examples of reference point mentioned above include time-frequency location of CORESET of PI monitoring occasion, center/boundary of NR carrier, channel number used for synchronization and/or channel raster, or center/boundary of RMSI BW, center/boundary of SS block accessed during the initial access or control region (i.e., first two/three symbols) of a slot, DMRS locations in a slot, etc. Even though the examples shown here are in the context of group common DCI, similar structure or same type of information can be conveyed in UE specific DCI as well, where UE specific DCI may or may not contain other information fields in addition to PI.

Figure 10:
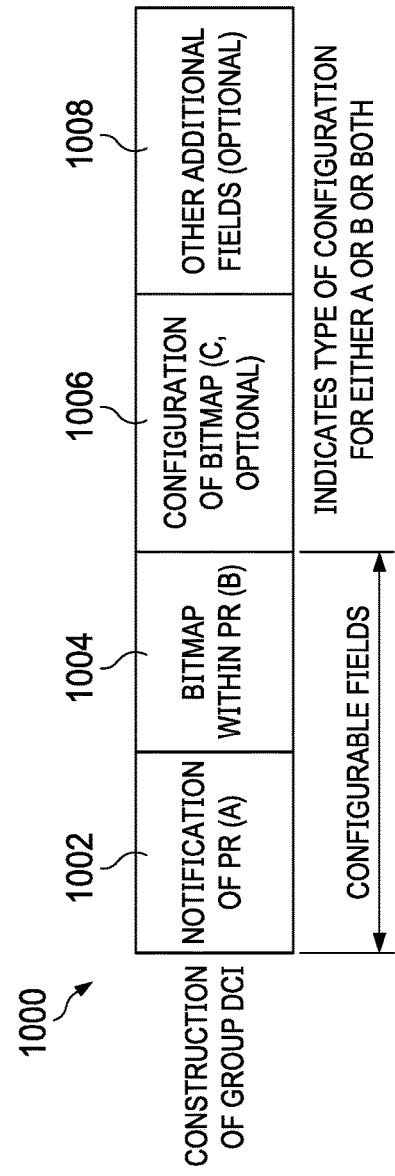
FIG. 10 illustrates an embodiment construction of group downlink control information (DCI) for pre-emption indication (PI).

FIG. 10 illustrates an embodiment construction of a group common DCI for a pre-emption indication (PI) 1000. The group DCI or group common DCI (GC DCI) for pre-emption indication may comprise field A with a notification of PR 1002, field B with a bitmap providing pre-emption information within the PR 1004, field C with a configuration of the bitmap and/or PR 1006, and/or other additional fields 1008. The group DCI for pre-emption indication may adaptively indicate a PR based on area(s) where actual pre-emption events occur. This way, more accurate pre-emption information may be provided based on actual location of pre-emption events compared to pre-configured area, thus resulting in better eMBB UE performance and higher throughput. In an embodiment, the group DCI for pre-emption indication may be a post indication, i.e., the indication addresses pre-emption events that occurred before the monitoring occasion of PI. Alternatively the group DCI may be sent during the pre-emption event and the PI may adaptively indicate the PR and/or PR bitmap based on the current pre-emption event. Construction of a group DCI for PI may be subject to payload constraints of group DCI or how many formats or payload sizes are supported.

In a first example, format of time and/or frequency granularities, i.e., x by y bitmap may be pre-configured, where values of x and y are semi-statically configured. The resolution may be semi-statically configured or dynamically updated as part of PI. For example, an N2-bit payload is used in a bitmap to indicate impacted portions within a PR. The bitmap may correspond to the indicated PR. For a fixed payload size bitmap, a PR of fixed or variable sizes may be indicated. For example, N1 bits may be used for notification of PR location and N2 bits for the bitmap. If the PR is a large area, each bit in the bitmap may correspond to a larger portion, thus a coarser granularity. If the PR is small, each bit in the bitmap may correspond to a smaller portion, thus a finer granularity. When the area of PR is updated, the resolution of each bit of the bitmap indicated in the PI may be re-configured accordingly. In one embodiment, fixed size PR is indicated (when resolution of a bit in bitmap is pre-configured and not changed dynamically) but location can change, i.e., starting position in time and/or frequency can change (shift from a reference position) and is indicated in field A. In another embodiment, variable size PR is indicated. Field A provides starting and ending positions or starting position and duration or ending position and duration. The pre-configured x by y bitmap corresponds to the indicated PR. In other words, PR area can not only be shifted from a reference position but also it can expand or shrink. For this example, field C may or may not be needed.

In a second example, number of time and/or frequency partitions within PR (i.e., values of x and y) and granularities (i.e., resolution or area of a resource unit represented by each bit of bitmap) may be adaptive. For example, N1 bits may be used for the notification of PR field, and N2 bits for the bitmap field. Several configurations or formats of a bitmap may be semi-statically notified and one configuration may be dynamically notified as part of PI. For instance, when N2=16 bits, one configuration of field B 1004 may be 8 by 2, and another configuration of field B 1004 may be 4 by 4. Field C 1006 may indicate which option is used for the current PI. In this example, the individual numbers of bits in fields A 1002 and B 1004 do not change. As shown in Table II, 8 bits are used in field A 1002 for notification of PR and 12 bits are used in field B 1004 for the bitmap. The configuration of the bitmap may be any of 4 by 3, 3 by 4, 6 by 2, 2 by 6, or some other configuration. Several configurations may be notified to the UE for a given payload of bitmap such as N2, the number of bits in field B. One configuration may be indicated in field C to be used for the current PI being used. For the following example in Table II, Field C has 2 bits to differentiate four configurations of the bitmaps, and each index number of C corresponds to one of the four configurations.

TABLE II

| A (# bits) | B (# bits) | C (config index) |
|---|---|---|
| 8 | 12 (4 by 3) | 1 |
| 8 | 12 (3 by 4) | 2 |
| 8 | 12 (6 by 2) | 3 |
| 8 | 12 (2 by 6) | 4 |

1 Alternatively, the numbers of bits in fields A and B may be variable while keeping the sum N of N1 and N2 fixed. This way, a more dynamic scenario of flexible PR and bitmap indication is supported. For example, more bits for PR imply less bits for bitmap, and vice versa. A given value of N2 bits may imply a configured bitmap, or several candidates for a given value of N2 bits may be configured and one specific configured bitmap may be indicated in the PI. Field C 1006 may indicate the configuration used for the current PI. As shown in table III, a total of 20 bits are used in field A 1002 and field B 1004 for notification of PR and bitmap fields, respectively. A number of configurations may be supported for a given value of N2 bits, for example, configuration of the bitmap may be any of 4 by 4, 8 by 2 for N2=16, 4 by 3, 3 by 4, 6 by 2, 2 by 6 for N2=12, 5 by 2 for N2=10, 4 by 2 for N2=8, or some other configuration. Fields A and B may be configurable and dynamically adapted. The index indicated in field C notifies a certain combination of N1 and N2 bits and a corresponding configuration for PI. In this example, field C has 3 bits so field C can indicate up to 8 combinations, index 1 in field C indicates the bit number in field A is 4, the bit number in field B is 16, and the bitmap configuration is 4 by 4. Index 2 in field C indicates the bit number in field A is 4, the bit number in field B is 16, and the bitmap configuration is 8 by 2.

TABLE III

| A (# bits) | B (# bits) | C (config index) |
|---|---|---|
| 4 | 16 (4 by 4) | 1 |
| 4 | 16 (8 by 2) | 2 |
| 8 | 12 (4 by 3) | 3 |
| 8 | 12 (3 by 4) | 4 |
| 8 | 12 (6 by 2) | 5 |
| 8 | 12 (2 by 6) | 6 |
| 10 | 10 (5 by 2) | 7 |
| 12 | 8 (4 by 2) | 8 |

Resolutions may also be dynamically indicated, and this may result in an increased number of bits used in field C. As shown in Tables IV and V, for the same configuration of a bitmap, different resolutions may be indicated by field C 1006. A set of resolutions {m, n, . . . } can be pre-configured and one resolution can be indicated in the PI. Table IV is expanded version of Table II, where each format of bitmap is shown to be associated with a set of resolutions. Here, each of {m, n, . . . } represents an area of a resource unit of partition within the PR. The resolution may correspond to time granularity only or time-frequency granularity or frequency granularity only. Table V is expanded version of Table III with resolution or granularity is dynamically indicated in the form of one configuration index.

TABLE IV

| A (# bits) | B (# bits) | C (config index) |
|---|---|---|
| 8 | 12 (4 by 3, resolution m) | 1 |
| 8 | 12 (4 by 3, resolution n) | 2 |
| . . . | . . . | . . . |
| . . . | . . . | . . . |

TABLE V

| A (# bits) | B (# bits) | C (config index) |
|---|---|---|
| 4 | 16 (4 by 4, resolution m) | 1 |
| 4 | 16 (4 by 4, resolution n) | 2 |
| 4 | 16 (8 by 2, resolution m) | 3 |
| 4 | 16 (8 by 2, resolution n) | 4 |
| . . . | . . . | . . . |
| . . . | . . . | . . . |
| . . . | . . . | . . . |
| . . . | . . . | . . . |

FIG. 11 illustrates an embodiment of adaptive notification of a PR. The notification of PR in Field A of a group DCI may comprise time-frequency region indication indicating the starting position and/or the ending position, and/or any other reference position (e.g., center) of/within the bandwidth (BW) of the PR in the frequency domain, and/or a size or range in frequency (e.g., RBGs/sub-band) in frequency domain. Additionally, the notification of PR in Field A of the group DCI may comprise time-frequency region indication indicating the starting position and/or the ending position and/or any other reference (e.g., center) position of/within the duration of PR, and/or the duration (e.g., in slots/symbols/ms) in time domain. The location of PR in time and/or frequency may be indicated with respect to a reference point. For the two time durations 1102 and 1104 of PRs, the bitmap configuration is dynamically indicated. Starting positions in time and frequencies and resolutions of the bitmaps are different while the number N2 of bits used for the bitmaps in both cases is the same—16. As can be seen in FIG. 11, the areas of the two PRs indicated by the adaptive notification of PR are different, and the granularities of time-frequency regions of the two PRs corresponding to each bit of the 16 bits are also different.

The construction of N1 bits in Field A of the group DCI may comprise different configurations. For example, the frequency location (e.g., starting position) and range in frequency may be given, and the N1 bits may be used for indicating the starting position and/or duration in time. Or, the time starting position and duration may be given, and the N1 bits may be used for indicating location (e.g., starting position) and/or range in frequency. Alternatively, the N1 bits may be further divided into $N1_f$ and $N1_t$ bits, and the $N1_f$ and $N1_t$ bits indicate starting position in frequency and time, respectively. Higher layer signaling may notify a UE which configuration in Field A is used, i.e., what is value of $N1_f$ and $N1_t$ for a given value of N1. N1 bits can be constructed as [$N1_f$ bits $N1_t$ bits] or [$N1_t$ bits $N1_f$ bits], i.e., time indication may be followed by frequency indication or vice versa. For a given N1 bits, one of several candidate configuration may be indicated by using field C in the group DCI. For example, N1=4 bits can be divided into $N1_f$=2 and $N1_t$=2 or $N1_f$=1 and $N1_t$=3, etc., and one of the configuration for a given payload N1 is indicated in PI, e.g., via field C.

Not all components of the notification may be dynamically indicated. In a first example, the starting position in time and/or frequency is notified dynamically while frequency size and/or time duration is indicated semi-statically or obtained from the configuration of bitmap of the PI such as a chosen bitmap configuration. Each bit may correspond to a time-frequency resource unit for a given bitmap configuration, e.g., the resolution of a bit is known to the UE. If there are four frequency divisions configured or notified semi-statically, then the range in frequency may be obtained as four times the size of each time-frequency unit in frequency. In a similar way, the time duration can be obtained.

In a second example, the starting position in frequency and/or time duration is notified semi-statically while the frequency range and/or time duration is indicated dynamically to the UE. The indication for the frequency range and/or time duration may be implicit or explicit. The frequency range or time duration may be dynamically obtained based on explicit signaling, such as indicated bitmap for pre-emption events and its configuration, and/or resolution. For example, the frequency range or time duration addressed by each bit may also be dynamically indicated.

In a third example, both the starting position in time and/or frequency and frequency size and/or time duration are dynamically indicated. The frequency range or time duration may be dynamically obtained based on explicit signaling, such as ending position or duration or range in time/frequency is indicated in addition to starting position or indicated bitmap for pre-emption events and its configuration, and/or resolution. For example, the frequency range or time duration addressed by each bit may also be dynamically indicated. The indication for frequency range or time duration may be implicit or explicit. If both starting and ending positions are indicated for a PR, no separate notification of resolution of a bit in the indicated bitmap may be sent. In that case, the resolution may be obtained by dividing the range/duration by the indicated number of time and/or frequency divisions/partitions in the bitmap, i.e., values of x and y.

The starting position in time/frequency may be indicated based on a granularity of i RBGs in frequency and j symbols/slots/ms in time, with respect to a given numerology. Some candidate positions such as M locations in frequency and/or N locations in time within a potential scope of PI may be semi-statically configured, and $Log_2$ M and/or $Log_2$ N bits can be used to indicate the starting position in time and/or frequency among the configured locations. Configured locations can be defined or obtained as a shift or offset from a reference point. Hence, there can be M possible shifts in frequency and/or N possible shifts in time with respect to a reference point within a potential scope of PI may be semi-statically configured A range in frequency and duration in time may be contiguous or non-contiguous. When the range in frequency or duration in time is contiguous, possible values of range/duration (L) may be configured by a higher layer, and one of them may be indicated such as by $Log_2$ L bits. When the range in frequency or duration in time can be non-contiguous and if it is dynamic, a bitmap for notifying the PR may be used. If the unused area is semi-statically configured, bitmap indication for PR may not be needed and range/duration indication may be enough. UE, based on semi-static notification of unused/reserved/unknown resources, identifies the effective region within the PR, i.e., even if an unused resource falls within the scope of PR, UE may assume that the bitmap of PI only corresponds to the area that can actually be pre-empted. In some cases, a single PI may correspond to disjoint frequency ranges.

FIG. 12 illustrates an embodiment non-contiguous PR. Indicated PR may be non-contiguous in time and/or frequency, e.g., with cross-bandwidth part scheduling within a carrier. A set of UEs may be scheduled across non-contiguous BWP1 1202 and BWP2 1204. The bandwidth 1206 with numerology k between the BWP1 1202 and BWP2 1204 may be unknown to a UE or reserved. BWP1 1202 and BWP2 1204 have numerologies i and j, respectively, and numerologies i, j, and k may be the same or different. In this example, search space for PI can be either in BWP1 or BWP2. The bitmap of PI corresponds to parts of PR in BWP1 and 2. In one embodiment, f1 and f2 may correspond to part of PR in BWP1 and f3 and f4 may correspond to BWP2 in Table I.

Even though the illustrations are shown for group common PI, same embodiments can be applied for UE specific PI as well. For example, pre-configured/default PR for a UE is the time-frequency resources assigned in the DL grant and UE may receive a PI after it is scheduled where the PI can dynamically update the PR based on actual location of pre-emption events overlapping with the assigned resources of the UE.

Figure 13:
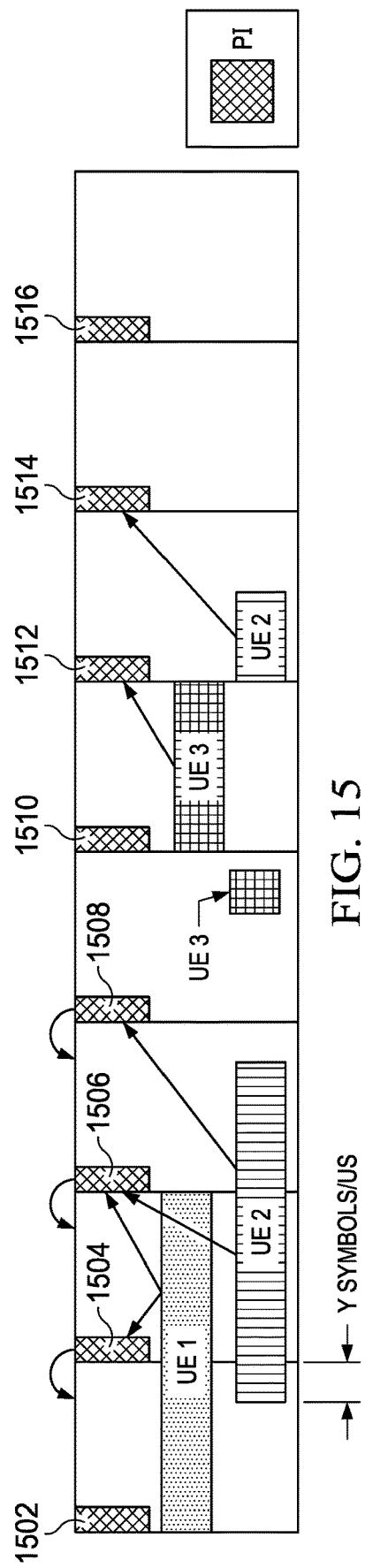
FIG. 13 illustrates an embodiment structure of a group common DCI (GC DCI).

FIG. 13 illustrates an embodiment structure of a group common DCI (GC DCI). Several types/formats may be configured by a higher layer, and one may be indicated dynamically in a GC DCI. As shown in FIG. 13, the GC DCI may comprise a type field, a payload field, and/or a radio network temporary identifier (RNTI) field. The content of the GC DCI may be configurable. The same DCI may be used for providing one or multiple types of control information. For example, if the GC DCI is only for PI, a first type of payload has common field(s) read by all UEs. The common field(s) either provides bitmap of pre-emption information for a configured region or both region and bitmap of pre-emption information are conveyed jointly in a dynamic manner. A second type of payload may comprise a number of UE specific fields in the GC DCI, and the payload may be divided into N UE specific fields. Each of the N UE specific fields may be configurable according to transmission properties or parameters of a UE (e.g., transmission duration, TB size, BW part size, RBs assigned in the DL grant etc.). A third type of payload may be a combination of the first and second types, i.e., payload is divided into two portions. First portion contains common information field(s) for a first group of UEs whereas second portion is divided into UE specific fields for second group of UEs.

Alternatively, the GC DCI may combine multiple types of control information instead of only for PI. A first type of the payload under this category may provide PI only, a second type of payload may provide PI and another type of control information, and a third type of payload may one or more other types of control information.

A group DCI may have UE specific fields to tailor content of each field according to the parameters of each UE's transmission For example, a first UE may require increased coverage and is scheduled with longer interval while a second UE may be scheduled with a shorter duration with or without occupying large resources in frequency. As another example, re-transmission sometimes occupies a shorter duration than the initial transmission. Thus, a one size-fit-all granularity of PI may not be beneficial for all UEs and consequently the performance of the UEs may be affected with a PI with the one size-fit-all granularity.

When the payload size of the group DCI is fixed, the construction of the payload may be configurable. For example, the payload may not be UE specific but may be common to a group of UEs monitoring pre-emption indications. Alternatively, the payload is divided into UE specific fields, and each UE specific field may be further configured. For instance, each UE field may have N bits while configured time and/or frequency granularity may be the same or different for different UEs. Dynamic indication of PR and/or bitmap configuration and/or granularity/resolution of bit in bitmap can be independently adapted for each UE. Or, one UE specific field may differ in the number of bits than another UE specific field. In some cases, some contents of PI can be common whereas some content can be UE specific. For example, bitmap configuration can be common to the UEs, however PR and/or bitmap information can be different.

The payload size may vary or may be configurable. Different formats may be supported. UEs may be notified either by DCI, a system information block (SIB), RRC, or media access control element (MAC CE) of (re)-configured payload size and configuration of GC DCI, and of which type of GC DCI the UEs are configured to monitor or decode. The payload may be divided into UE specific field and/or common field.

As discussed above, the payload size may be fixed or configurable, and GC DCI may provide one or multiple types of such information. The GC DCI may provide pre-emption information only or other common information in addition to the pre-emption information. The content of the payload may be configurable, e.g., sometimes a GC DCI only carries PI, other times the GC DCI provides other types of info, or both. UEs may be pre-configured regarding the structure and configuration of the GC DCI and/or which configuration is active for a period of time. The DCI (UE specific/group based) may also activate a certain configuration of a group DCI.

Search space of a GC DCI carrying PI may or may not be shared with other GC or UE specific DCI or PDCCH. In some cases, GC DCI for PI may be transmitted in UE specific search space. For example, when UE BWP does not have common search space configured in it, and no UE spec PDCCH to receive, then eNB may use UE specific search space to send GC DCI for PI. This can be applicable to any type of GC DCI.

Multiple DCI formats can be used for sending PI. UE can be notified of semi-static configuration of PI and one DCI format may update the configuration. For example, DCI format 1 can be used to send bitmap of pre-emption information for a pre-configured PR. DCI format 2 can be used for adaptive notification of PR along with bitmap. When DCI format 2 is received, it may over write the pre-defined configuration of PR and/or bitmap configuration. DCI format 1 and 2 may have same or different payload. DCI format 1 and/or 2 may include other types of control information as well. A UE can be configured to support both or one of them or none.

Coexistence or pre-emption region (PR) is defined as a time-frequency region where eMBB transmissions can be pre-empted due to overlapping URLLC transmissions. GC DCI in PDCCH indication may contain N bits to convey pre-emption information for a PR. Different GC DCIs in PDCCHs may correspond to different PRs. Multiple GC DCIs in PDCCHs may be sent in the same or different time instants corresponding to overlapping or non-overlapping PRs. An eMBB UE may monitor one or multiple GC DCIs in PDCCHs depending on how the UE's transmission overlaps with parts of the PR(s). Multiple PRs may be contiguous or non-contiguous in frequency and/or in time.

At a given time, there may be one or multiple activated PRs. A UE transmission may be contained within a PR or span multiple PRs, and PRs may be of the same or different numerologies. Alternatively, a given PR may be segmented into multiple parts in time and/or frequency, and a GC PI may be sent for each part. Configuration of a PR may be notified by UE specific or cell-specific signaling either by RRC or DCI.

A PR may be activated or deactivated by a DCI such as a UE specific DCI or GC DCI. Alternatively, RRC configuration reception may imply an activated PR. PI numerology may be the same or different from the numerology used in PR(s). Multiple numerologies may coexist within a PR, e.g., in frequency division multiplexing (FDM) and/or time division multiplexing (TDM) manner. Time and/or frequency granularity of a PI may be according to a given numerology.

Figure 14:
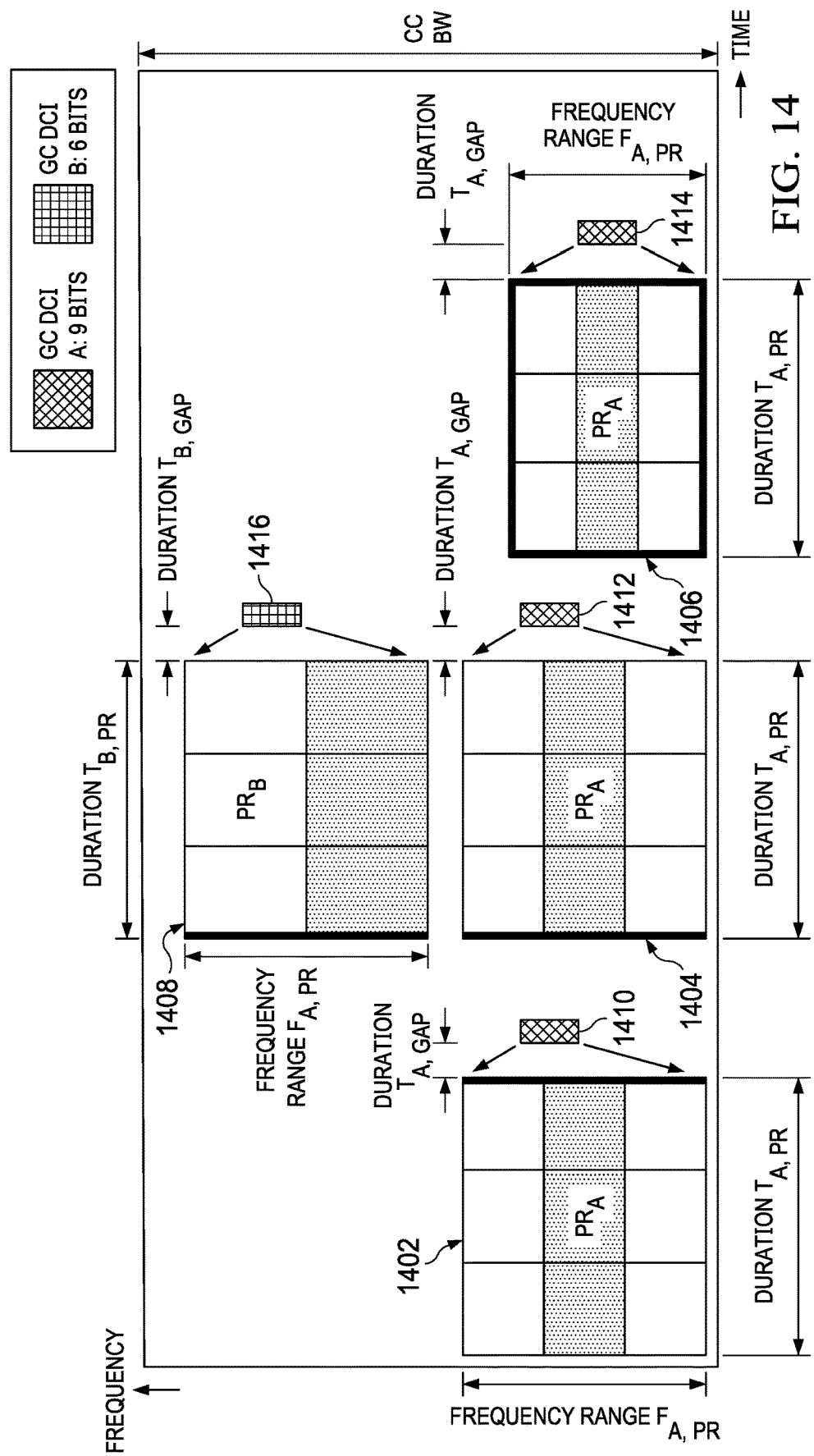
FIG. 14 illustrates another embodiment adaptive notification structure of a PR.

FIG. 14 illustrates another embodiment of adaptive notification structure of a PR. As shown in FIG. 14, each GC DCI A 1410, 1412, 1414 corresponds to a $PR_A$ 1402, 1404, 1406, respectively, and a GC DCI B 1416 corresponds to a $PR_B$ 1408. A GC DCI payload may be fixed, e.g., N bits, and the size of a PR in time and/or frequency may be configured with different values. As can be seen, the size of $PR_A$ 1402 is different from the size of $PR_A$ 1406, the size of $PR_A$ 1402 or 1404 is the same as the size of $PR_B$ 1408, and the granularity of divisions in the time-frequency region $PR_A$ 1402 is different than the granularity of divisions in the time-frequency region $PR_B$ 1408. In other words, the area of a PR (e.g., $PR_A$) and granularity of notification of pre-emption information in a PI for a PR may be updated or (re)-configured. A UE may be notified of re-configuration of a PR by RRC signaling or DCI. GC DCI for PI for $PR_A$ can be monitored after a duration $T_{A,PR}$, and the $T_{A,PR}$ can be notified to the UE by RRC signaling. The duration $T_{A,PR}$ may be configured with different values.

GC DCI for PI can be monitored inside or outside the corresponding PR, e.g., the search space for GC DCI for PI may or may not be configured within the PR. UEs that are monitoring a GC DCI may be notified of its search space semi-statically, e.g., via RRC signaling. In this example, each bit of 9 bits of GC DCI A 1410, 1412, 1414 corresponds to a block in a 3 by 3 resource grid of $PR_A$ 1402, 1404, 1406 and indicates a configurable resource unit, i.e., the unit size may vary, and each bit of 6 bits of GC DCI B 1416 corresponds to a block in a 3 by 2 resource grid of $PR_B$ 1408 and indicates a configurable resource unit. The scope of GC DCI A 1410, 1412, 1414 may be (re)-configured. The area of a PR may change as a result of reconfiguring definition of granularity of PI, e.g., what each bit refers in terms of time-frequency unit size, while the total number of resource units stays the same. The duration/interval (e.g., $T_{A, Gap}$, $T_{B, Gap}$) between PR and search space for monitoring PI can be configured or dynamically updated.

FIG. 15 illustrates an embodiment UE behavior when monitoring GC DCI with common pre-emption information. As shown in FIG. 15, each UE may be notified of a periodicity of monitoring the PI sent in the form of a GC-DCI in a PDCCH in a control resource set (CORESET). The notification of the periodicity to monitor the PI in a CORESET may be conveyed by RRC signaling such as UE specific or group-specific (e.g., cell specific) RRC signaling or system information.

The group-common indication in a CORESET can be configured to be received every K slots/symbols for a given numerology. Value of K can be configurable and different for each numerology. For example, if the group-common PDCCH is sent every K slots/symbols, it may contain indication related to the pre-empted/impacted areas of transmissions over a group of symbols/slots that appeared on or before the location that contains the indication.

In one example, one monitoring periodicity of X ms can be configured to monitor PI, where X ms is common across all numerologies. X ms may consist of $L>=1$ slots for $f0=3.75$ kHz and $2^N*L$ slots for $f=2^N*f0$ kHz for same or different CP overhead/type. Alternatively, X ms may consist of $L>=1$ symbols for $f0=3.75$ kHz and $2^N*L$ slots for $f=2^N*f0$ kHz for the same CP overhead/type. Hence, the monitoring interval in # slots/symbols can be scalable across numerologies. For a given TBS, eMBB transmission may use one slot for 15 kHz whereas it may comprise aggregated slots in larger sub-carrier spacing. A common monitoring interval (in ms) can be maintained even if a UE switches numerology. In one example, PI monitoring periodicity in a CORESET is the same in ms across all numerologies and 1 slot, 2 slots, and 4 slots for 15 kHz, 30 kHz, and 60 kHz, respectively. In another example, monitoring periodicity of PI in a CORESET can be M slots, where value of M depends on numerology and configurable. M can be $L>=1$ slots for $f0=3.75$ kHz and $M=2^N*L$ slots for $f=2^N*f0$ kHz for same or different CP type/overhead. Alternatively, monitoring periodicity of PI in a CORESET can be M symbols, where value of M depends on numerology and configurable. M can be $L>=1$ symbols for $f0=3.75$ kHz and $M=2^N*L$ symbols for $f=2^N*f0$ KHz for same CP type/overhead. Any other value of f0 is also possible.

In another example, same or different monitoring periodicity in slots/symbols can be configured for different CP types for a given numerology.

In another example, time and/or frequency granularity of pre-emption indication can be scalable across numerologies. For example, if L symbols is configured as time granularity for f0 for a given CP type, then $2^N*L$ symbols can be time granularity for sub-carrier spacing $2^N*f0$. Similar scalable relationship in terms of RBGs or Hz is possible in frequency domain as well.

After a UE is scheduled, the UE may start monitoring the GC-PDCCH from the next occasion, e.g., UE1 starts monitoring the next PI transmitted in a GC-PDCCH 1504 after being scheduled. After UE is scheduled, the UE may skip x monitoring occasions, e.g., UE 2 skips one monitoring occasion of PI or GC-PDCCH 1504 and starts monitoring GC-PDCCH from the PI or the GC-PDCCH 1506. UE may skip a monitoring occasion if it is within y symbol/us of receiving a DL grant. Within y symbol, there may not be any pre-emption because an eNB may avoid pre-emption by scheduling the eMBB and URLLC transmissions in non-overlapping resources for that duration.

A UE may skip monitoring for a period of time, e.g., UE 2 skips monitoring GC-PDCCHs 1510 and 1512. For example, the UE may be configured not to monitor, a PI may be sent in a numerology which the UE is not configured with, or the CORESET of the PI may be in a location that is outside the BW part of a UE for a period of time. Alternatively, if a PI has UE specific fields and a UE is configured to monitor at the end or after an impacted data transmission, the UE may also skip some monitoring occasions that fall within the duration of the impacted data transmission.

The monitoring periodicity of a UE-specific PDCCH in a CORESET and GC-DCI in PDCCH in a CORESET can be the same or different. Whether monitoring periodicity of a UE-PDCCH and GC-DCI in PDCCH is the same or different may or may not depend on whether the content of a pre-emption indicator has UE specific fields.

The periodicity of a UE-PDCCH may be larger than the periodicity of the GC-DCI in PDCCH when the monitoring periodicity of the GC-DCI in PDCCH is at group of URLLC granularities (e.g., symbol level) or less than the length of scheduling interval configured or indicated for eMBB UEs. The periodicity of a UE-PDCCH may be smaller than or equal to the periodicity of the GC-DCI in PDCCH when the GC-DCI in PDCCH duration is at one or group of slot boundaries. Thus, monitoring occasions of UE-PDCCH and GC-PDCCH may or may not align, and a data transmission duration may span multiple UE-PDCCH and/or GC-PDCCH monitoring occasions.

A group of UEs may be formed depending on a set of CORESET monitoring periodicity. For example, a first PI is configured for a group of UEs with shorter monitoring periodicity of UE PDCCH and a second PI is configured for a group of UEs with longer monitoring periodicity of UE PDCCH.

Figure 16:
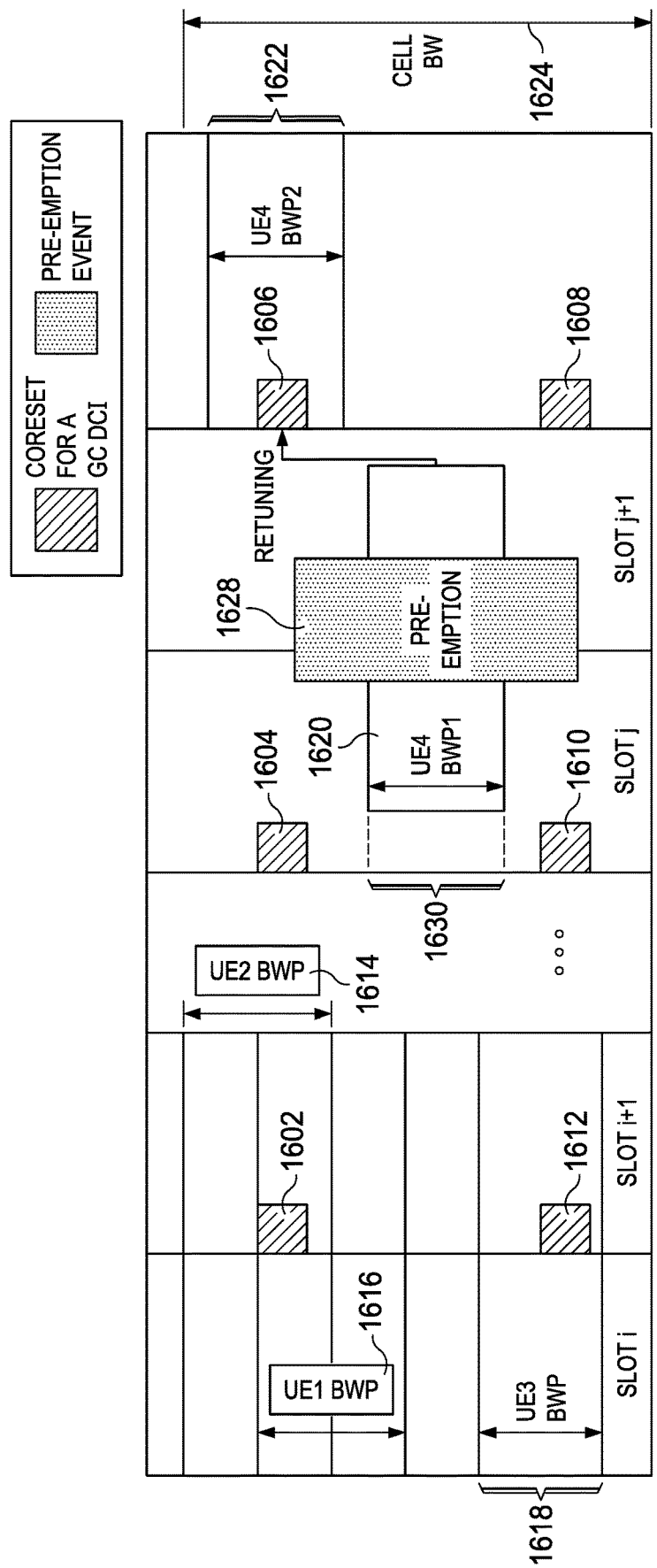
FIG. 16 illustrates another embodiment UE behavior when monitoring GC DCI with common information.

FIG. 16 illustrates another embodiment UE behavior when monitoring GC DCI with common pre-emption information. As shown in FIG. 16, when UE BW capability such as UE 2 BWP 1614 is less than a cell/carrier BW 1624, one or more configurable time-frequency regions may be used to send group-common signaling such as GC DCIs 1602-1612. In this example, two frequency regions are used to send GC DCIs 1602-1612. If a common PDCCH comprising a GC DCI is sent targeting multiple UEs, at least one BWP of a UE that is configured to monitor the GC DCI may overlap with at least one common search space region. For example, both the UE 2 BWP 1614 and UE1 BWP 1616 overlap with the bandwidth in which the GC DCIs 1602-1606 are sent, and the UE3 BWP 1618 overlaps with the bandwidth in which the GC DCI 1608-1612 are sent.

However, UE4 may monitor GC DCIs for PI in a different BWP, UE4 BWP2 1622, than the BWP 1630 that observed a pre-emption transmission event 1628.

A UE can be configured with multiple BWPs, and not all BWPs may contain the common search space. A UE may retune/switch to the BWP containing the common search space with a pre-configured periodicity. For example, when a monitoring interval/periodicity of a GC DCI for PI is 5 TTIs, the UE may switch to the BWP containing the GC DCI for PI I every 5 TTIs.

The UE may be configured with a pattern for BWP switching, e.g., UE uses a first BWP for a first duration and then switches to a second BWP for a second duration. Second BWP may have common search space and PI is monitored in second BWP. However, both BWP1 and BWP2 can be pre-empted. The switching/returning time may be a third duration which can be function of UE capability and UE may not receive any transmission during switching time.

A UE may be configured with one or multiple bandwidth parts. DL and UL bandwidth parts are separately configured. If the UE is receiving or transmitting transmissions that have high reliability requirement, the UE can be configured with time pattern or hopping pattern for switching from one bandwidth part to another for transmissions of a transport block. For example, in DL communication, the UE may be scheduled (either dynamic or semi-persistent) with K repetitions for a TB. The repetitions can be made in different bandwidth parts so that frequency diversity can be achieved when the UE combines different transmissions/repetitions of a TB. In another example, for DL communication, eNB may send subsequent transmissions of a TB following an initial transmission in different bandwidth parts. UE may switch to a different bandwidth part in successive PDCCH/CORESET monitoring occasion and this can be achieved by a pattern of switching which can be function of CORESET/PDCCH monitoring interval and the pattern can be semi-statically or dynamically indicated to the UE. In one embodiment, a UE is configured with three DL bandwidth parts B1, B2, B3. If single bandwidth part is active in one time instant, a time pattern can be indicated so that B1, B2, B3 is active in non-overlapping durations t1, t2, t3, respectively. Different sequences of bandwidth part activation is possible such as B1→B2→B3→B1→B2→B3 etc. When the UE is in Bi, i={1,2,3}, the UE monitors CORESET in Bi.

Similarly for UL communication, for transmissions with or without grant, a UE can be configured to switch/hop from one bandwidth part to another for subsequent transmissions of a TB. The configuration of UL bandwidth parts and/or hopping pattern can be semi-statically or dynamically indicated to the UE. Similar to the above embodiment, a UE is configured with three UL bandwidth parts B1, B2, B3. If single bandwidth part is active in one time instant, a time pattern can be indicated so that B1, B2, B3 is active in non-overlapping durations t1, t2, t3, respectively. Different sequences of bandwidth part activation is possible such as B1→B2→B3→B1→B2→B3 etc. In one example, t1=t2=t3 is duration of each transmission. If a UE is configured with K repetitions for an UL transmission without grant, the UE may be configured to switch bandwidth parts for subsequent repetitions. If the UE has a packet arrived when B2 is active, the UE may transmit in that bandwidth part and then switch to B3 for next repetition of the TB for the sequence mentioned above.

In some embodiments, UL bandwidth part configurations of a UE that is transmitting without grant may also include transmission parameters for UL transmission without grant such as TBS/MCS, RS, power control parameters, number of repetitions, number of HARQ processes supported etc. Activation of different BWPs may indicate different configured parameters for UL transmission without grant. Activation of BWP(s) and/or a hopping pattern can be obtained by UE specific or GC DCI or RRC configuration may imply activation.

A bandwidth part configured for a UE can be used for transmitting/receiving over multiple numerologies simultaneously, different numerologies at different times.

FIG. 17 illustrates a block diagram of an embodiment processing system 1700 for performing methods described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1704. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1710, 1712, 1714 connects the processing system 1700 to a transceiver adapted to transmit and receive signaling over the telecommunications network. FIG. 18 illustrates a block diagram of a transceiver 1800 adapted to transmit and receive signaling over a telecommunications network. The transceiver 1800 may be installed in a host device. As shown, the transceiver 1800 comprises a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 comprises one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

FIG. 19 is a flowchart of an embodiment method 1900 for wireless communications, as may be performed by a UE. At operation 1902, the UE may receive from a base station a first signal over first resources. The first resources may be assigned to carry downlink transmissions. At operation 1904, the UE may receive from the base station a first downlink control indication (DCI) message. The first DCI message may comprise a bitmap that includes bits associated with different portions of a time-frequency region. Each of the bits in the bitmap may indicate whether a downlink transmission for the UE is present in the corresponding portion of the time-frequency region. Each of the bits in the bitmap may additionally or alternatively indicate whether a preemptive downlink transmission for another UE is present in the corresponding portion of the time-frequency region. The bits in the bitmap may comprise a sequence of time division bit groups corresponding to different time divisions. Each of the time division bit groups may include one or more bits. The one or more bits in each of the time division bit groups may correspond to one or more frequency divisions, and the one or more bits in each of the time division bit groups may correspond to a same time division.

In one embodiment, the bits included in the bitmap may be consecutive bits, and each of the time division bit groups may include two or more consecutive bits. The word "consecutive" means following one another in uninterrupted succession or order (i.e., no intervening data). Here, the consecutive bits in the bitmap mean that the bits in the bitmap follow one another in uninterrupted succession. So, there is no intervening data between two consecutive bits in the bitmap. Also, two or more consecutive bits in a time division group mean that bits in the same time division group follow one another in uninterrupted succession. So, there is no intervening data between two consecutive bits in the same time division.

In one embodiment, each of the time division bit groups may comprise a first bit and a second bit. The first bit may correspond to a same first frequency division, and the second bit may correspond to a same last frequency division.

In one embodiment, before the UE receives the first DCI message, the UE may receive from the base station a first radio resource control (RRC) message. The first RRC message may indicate a payload size of the DCI message. The first RRC message may also indicate the time-frequency region and granularities of respective time and frequency divisions.

FIG. 20 is a flowchart of an embodiment method 2000 for wireless communications, as may be performed by a base station (BS). At operation 2002, the BS may transmit to a UE a first signal over first resources. The first resources may be assigned to carry downlink transmissions. At operation 2004, the BS may transmit a first downlink control indication (DCI) message. The first DCI message may comprise a bitmap that includes bits associated with different portions of a time-frequency region. Each of the bits in the bitmap may indicate whether a downlink transmission for the UE is present in the corresponding portion of the time-frequency region. Each of the bits in the bitmap may additionally or alternatively indicate whether a preemptive downlink transmission for another UE is present in the corresponding portion of the time-frequency region. The bits in the bitmap may comprise a sequence of time division bit groups corresponding to different time divisions. Each of the time division bit groups may include one or more bits. The one or more bits in each of the time division bit groups may correspond to one or more frequency divisions, and the one or more bits in each of the time division bit groups may correspond to a same time division.

In one embodiment, the bits included in the bitmap may be consecutive bits, and each of the time division bit groups may include two or more consecutive bits. The word "consecutive" means following one another in uninterrupted succession or order (i.e., no intervening data). Here, the consecutive bits in the bitmap mean that the bits in the bitmap follow one another in uninterrupted succession. So, there is no intervening data between two consecutive bits in the bitmap. Also, two or more consecutive bits in a time division group means that bits in the same time division group follow one another in uninterrupted succession. So, there is no intervening data between two consecutive bits in the same time division.

In one embodiment, each of the time division bit groups may comprise a first bit and a second bit. The first bit may correspond to a same first frequency division, and the second bit may correspond to a same last frequency division.

In one embodiment, before the BS transmits the first DCI message to the UE, the BS may transmit to the UE a first radio resource control (RRC) message. The first RRC message may indicate a payload size of the DCI message. The first RRC message may also indicate the time-frequency region and the granularities of respective time and frequency divisions.

Embodiments in this disclosure provide technical solutions to technical problems. Low latency data may be bursty or sporadic in nature, and may be transmitted in short packets. So, it may be inefficient to dedicate resources for low latency data in conventional systems. Defining a coexistence region in which a resource assignment for latency tolerant traffic overlaps with resource assignment for low latency traffic in the time and frequency domains improves network functionality. Specifically, using a bit map to indicate whether preemptive downlink transmissions are present in the coexistence region provides a flexible technique for efficient utilization of network resources over conventional systems.

Although the description has been described in detail, it should be understood that in which a resource assignment for latency tolerant traffic overlaps with resource assignment for low latency traffic in the time and frequency domains various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for wireless communications, comprising:
receiving, by a user equipment (UE) from a base station (BS), a first data transmission over first resources assigned to carry downlink transmissions; and
receiving, by the UE from the BS, a first downlink control indication (DCI), the first DCI comprising a bitmap that includes bits associated with different portions of a time-frequency region, the time-frequency region including at least a portion of the first resources, and each of the bits in the bitmap indicating whether a scheduled downlink transmission is present in a corresponding portion of the time-frequency region, wherein the bits in the bitmap comprise a sequence of bit groups, each of the bit groups includes one or more bits, and the one or more bits in each of the bit groups correspond to one or more frequency divisions of a same time division.

2. The method of claim 1, wherein the bits included in the bitmap are consecutive bits, and each of the bit groups includes two or more consecutive bits.

3. The method of claim 1, wherein each of the bit groups comprises a first bit and a second bit, the first bit corresponding to a first frequency division, and the second bit corresponding to a last frequency division.

4. The method of claim 3, wherein the first bit in each of the bit groups corresponds to a same first frequency division, and the second bit in each of the bit groups corresponds to a same last frequency division.

5. The method of claim 1, further comprising:
receiving, by the UE from the BS, a first radio resource control (RRC) message indicating a payload size of the DCI.

6. The method of claim 5, the first RRC message further indicating the time-frequency region.

7. The method of claim 5, the first RRC message further indicating granularities of respective time and frequency divisions.

8. The method of claim 1 wherein each of the bits in the bitmap indicates whether a preemptive downlink transmission for another UE is present in the corresponding portion of the time-frequency region.

9. A user equipment (UE) configured for wireless communications, the UE comprising:
a non-transitory memory storage comprising instructions; and
one or more processors in communication with the non-transitory memory storage, wherein the one or more processors execute the instructions to:
receive, from a base station (BS), a first data transmission over first resources assigned to carry downlink transmissions; and receive, from the BS, a first downlink control indication (DCI), the first DCI comprising a bitmap that includes bits associated with different portions of a time-frequency region, the time-frequency region including at least a portion of the first resources, and each of the bits in the bitmap indicating whether a scheduled downlink transmission is present in a corresponding portion of the time-frequency region, wherein the bits in the bitmap comprise a sequence of bit groups, each of the bit groups includes one or more bits, and the one or more bits in each of the bit groups correspond to one or more frequency divisions of a same time division.

10. The UE of claim 9, wherein the bits included in the bitmap are consecutive bits, and each of the bit groups includes two or more consecutive bits.

11. The UE of claim 9, wherein each of the bit groups comprises a first bit and a second bit, the first bit corresponding to a first frequency division, and the second bit corresponding to a last frequency division.

12. The UE of claim 11, wherein the first bit in each of the bit groups corresponds to a same first frequency division, and the second bit in each of the bit groups corresponds to a same last frequency division.

13. The UE of claim 9, wherein the one or more processors further execute the instructions to:
receive a first radio resource control (RRC) message indicating a payload size of the DCI.

14. The UE of claim 13, the first RRC message further indicating the time-frequency region.

15. The UE of claim 13, the first RRC message further indicating granularities of respective time and frequency divisions.

16. The UE of claim 9 wherein each of the bits in the bitmap indicates whether a downlink transmission for another UE is present in the corresponding portion of the time-frequency region.

17. A method for wireless communications, comprising:
transmitting, by a base station (BS) to a user equipment (UE), a first data transmission over first resources assigned to carry downlink transmissions; and
transmitting, by the BS to the UE, a first downlink control indication (DCI), the first DCI comprising a bitmap that includes bits associated with different portions of a time-frequency region, the time-frequency region including at least a portion of the first resources, and each of the bits in the bitmap indicating whether a scheduled downlink transmission is present in a corresponding portion of the time-frequency region, wherein the bits in the bitmap comprise a sequence of bit groups, each of the bit groups includes one or more bits, and the one or more bits in each of the bit groups correspond to one or more frequency divisions of a same time division.

18. The method of claim 17, wherein the bits included in the bitmap are consecutive bits, and each of the bit groups includes two or more consecutive bits.

19. The method of claim 17, wherein each of the bit groups comprises a first bit and a second bit, the first bit corresponding to a first frequency division, and the second bit corresponding to a last frequency division.

20. The method of claim 19, wherein the first bit in each of the bit groups corresponds to a same first frequency division, and the second bit in each of the bit groups corresponds to a same last frequency division.

21. The method of claim 17, further comprising:
transmitting, by the BS to the UE, a first radio resource control (RRC) message indicating a payload size of the DCI.

22. The method of claim 21, the first RRC message further indicating the time-frequency region.

23. The method of claim 21, the first RRC message further indicating granularities of respective time and frequency divisions.

24. The method of claim 17 wherein each of the bits in the bitmap indicates whether a preemptive downlink transmission for another UE is present in the corresponding portion of the time-frequency region.

25. A base station (BS) configured for wireless communications, the BS comprising:
a non-transitory memory storage comprising instructions; and
one or more processors in communication with the non-transitory memory storage, wherein the one or more processors execute the instructions to:
transmit, to a user equipment (UE), a first data transmission over first resources assigned to carry downlink transmissions; and
transmit, to the UE, a first downlink control indication (DCI), the first DCI comprising a bitmap that includes bits associated with different portions of a time-frequency region, the time-frequency region including at least a portion of the first resources, and each of the bits in the bitmap indicating whether a scheduled downlink transmission is present in a corresponding portion of the time-frequency region, wherein the bits in the bitmap comprise a sequence of bit groups, each of the bit groups includes one or more bits, and the one or more bits in each of the bit groups correspond to one or more frequency divisions of a same time division.

26. The BS of claim 25, wherein the bits included in the bitmap are consecutive bits, and each of the bit groups includes two or more consecutive bits.

27. The BS of claim 25, wherein each of the bit groups comprises a first bit and a second bit, the first bit corresponding to a first frequency division, and the second bit corresponding to a last frequency division.

28. The BS of claim 27, wherein the first bit in each of the bit groups corresponds to a same first frequency division, and the second bit in each of the bit groups corresponds to a same last frequency division.

29. The BS of claim 25, wherein the one or more processors further execute the instructions to:
transmit, to the UE, a first radio resource control (RRC) message indicating a payload size of the DCI.

30. The BS of claim 29, the first RRC message further indicating the time-frequency region.

31. The BS of claim 29, the first RRC message further indicating granularities of respective time and frequency divisions.

32. The BS of claim 25 wherein each of the bits in the bitmap indicates whether a downlink transmission for another UE is present in the corresponding portion of the time-frequency region.

* * * * *